United States Patent [19]

Weismann et al.

[11] Patent Number: 5,301,565
[45] Date of Patent: Apr. 12, 1994

[54] TRANSMISSION

[76] Inventors: Peter H. Weismann; Patrick L. Weismann, both of 1631 Indus St., Santa Ana, Calif. 92707

[21] Appl. No.: 909,989

[22] Filed: Jul. 7, 1992

Related U.S. Application Data

[60] Division of Ser. No. 647,650, Jan. 28, 1991, Pat. No. 5,131,285, which is a continuation-in-part of Ser. No. 333,599, Apr. 4, 1989, Pat. No. 4,987,790, which is a continuation-in-part of Ser. No. 19,217, Feb. 26, 1987, Pat. No. 4,817,451.

[51] Int. Cl.$^5$ .............................................. F16H 3/10
[52] U.S. Cl. ...................................... 74/336 R; 74/866
[58] Field of Search ................... 74/866, 336 R, 333; 192/38, 45, 48.92

[56] References Cited

U.S. PATENT DOCUMENTS

| | | | |
|---|---|---|---|
| 2,051,386 | 8/1936 | Murray | 192/44 |
| 2,061,288 | 11/1936 | Murray | 192/48.92 |
| 2,865,228 | 5/1954 | Weismann | 74/650 |
| 3,283,611 | 11/1966 | Weismann et al. | 74/650 |
| 3,388,779 | 6/1968 | Roper | 192/45 X |
| 3,406,798 | 10/1968 | Curran | 192/38 |
| 3,707,884 | 1/1973 | Go | 74/372 |
| 3,732,959 | 5/1973 | Lang et al. | 192/47 X |
| 3,926,878 | 2/1976 | Johnston, Jr. | 192/38 |
| 3,949,848 | 4/1976 | Fogelberg | 192/38 |
| 4,093,049 | 6/1978 | Watson et al. | 192/47 |
| 4,111,288 | 9/1978 | Fogelberg | 192/38 |
| 4,361,060 | 11/1982 | Smyth | 74/866 |
| 4,493,228 | 1/1985 | Vukovich et al. | 74/866 X |
| 4,527,447 | 7/1985 | Richards | 74/866 X |
| 4,531,620 | 7/1985 | Stone | 192/45 |
| 4,627,312 | 12/1986 | Fujeida et al. | 74/336 R X |
| 4,629,044 | 12/1986 | Post et al. | 192/47 X |
| 4,653,622 | 3/1987 | Miyake | 74/866 X |
| 4,723,643 | 2/1988 | Numazawa et al. | 192/48.92 X |
| 4,817,451 | 4/1989 | Weismann | 192/48.92 X |
| 4,860,607 | 8/1989 | Numazawa et al. | 74/336 R X |
| 4,987,790 | 1/1991 | Weismann | 192/45 X |
| 5,101,946 | 4/1992 | Lederman | 192/45 |
| 5,131,285 | 7/1992 | Weismann et al. | 192/38 X |
| 5,136,897 | 8/1992 | Boardman | 74/866 |
| 5,178,250 | 1/1993 | Ashikawa et al. | 74/333 X |
| 5,181,431 | 1/1993 | Zaiser et al. | 74/333 |

FOREIGN PATENT DOCUMENTS

| | | |
|---|---|---|
| 150877 | 10/1937 | Austria . |
| 337604 | 6/1921 | Fed. Rep. of Germany . |
| 1131958 | 6/1962 | Fed. Rep. of Germany . |
| 2150239 | 6/1985 | United Kingdom . |
| 219237 | 1/1942 | Switzerland . |
| 1237824 | of 1971 | U.S.S.R. . |

OTHER PUBLICATIONS

Soviet Inventions Illustrated, Sections P,Q: General/-Mechanical, Week 8707, Apr. 1987–Derwent Publications Ltd. SU-1237 824A.

Primary Examiner—Rodney H. Bonck
Assistant Examiner—Ryan W. Massey
Attorney, Agent, or Firm—Lyon & Lyon

[57] ABSTRACT

A transmission having engagement mechanisms which employ an engagement inner having cam surfaces forming the race thereof, an engagement outer having a circular outer race and rollers therebetween. A cage mechanism angularly positions the rollers such that they may be wedged between the cam surfaces and the outer race so as to interlock the engagement inner and outer. Actuator mechanisms are employed which are axially movable to engage and angularly position the cages relative to the engagement inner for controlling the engagement mechanism. A plurality of control systems both electronic and mechanical control the operation of the engagement mechanism so as to require substantially synchronous movement between engaging elements. Alternately, nonsynchronous shifting may be accomplished under power for power or rapid shifting. Clutch inhibit may also be employed to prevent premature reengagement of the clutch before shift complete.

9 Claims, 15 Drawing Sheets

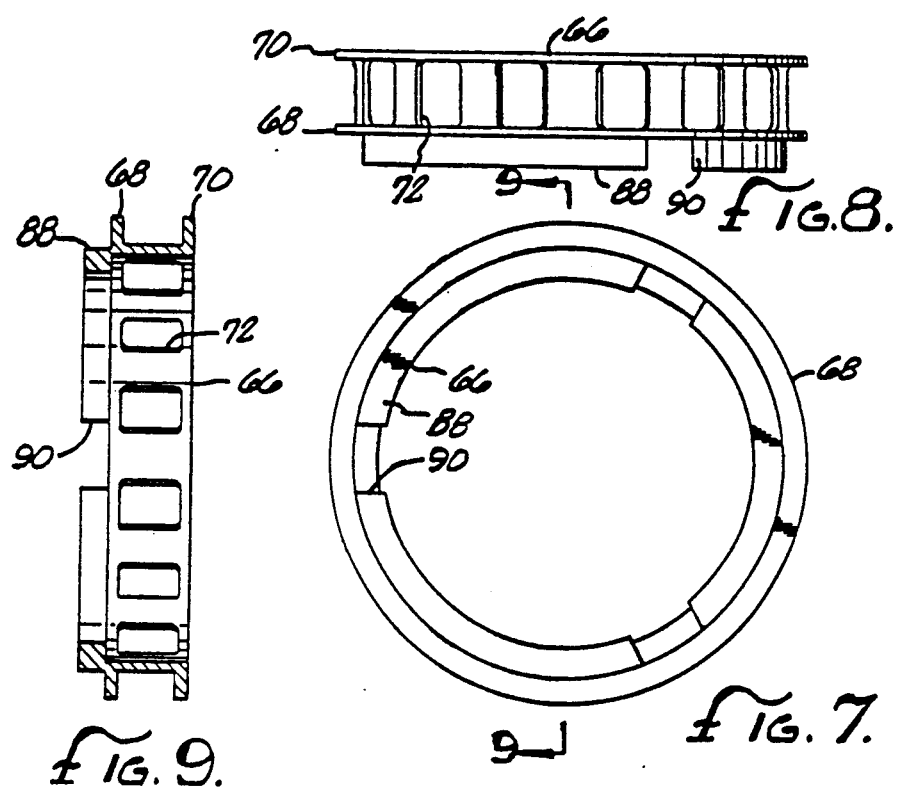
FIG. 8.
FIG. 9.
FIG. 7.
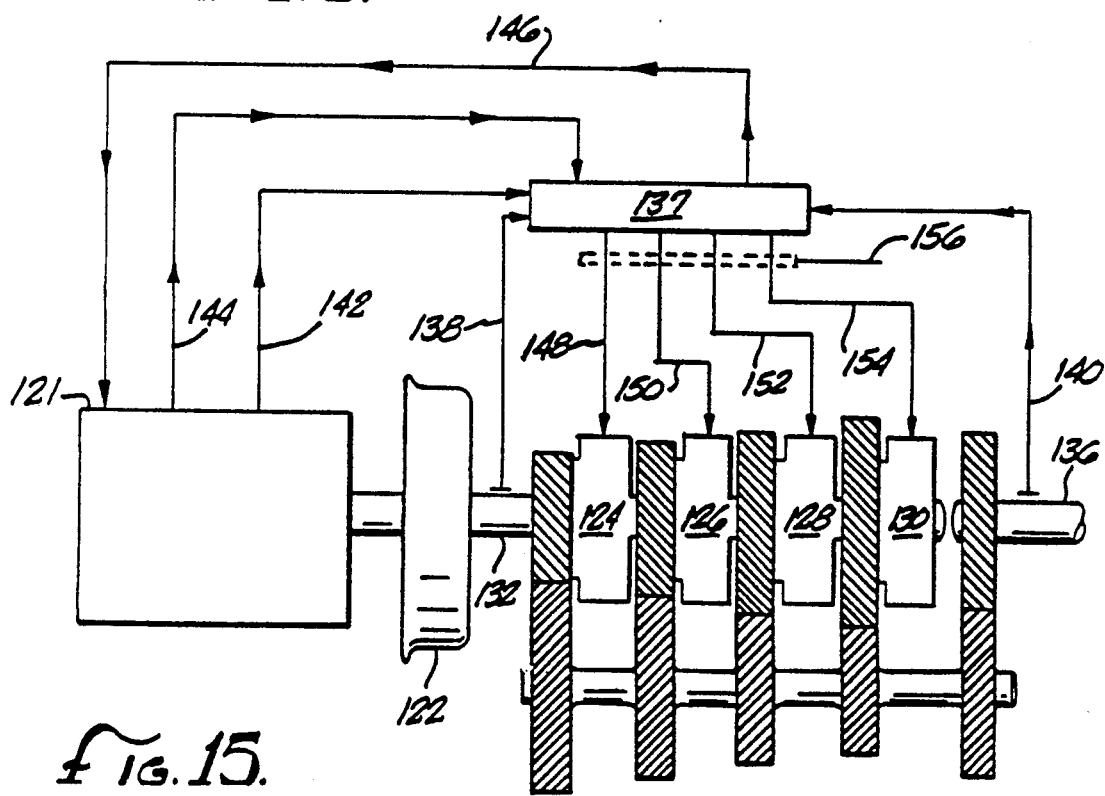
FIG. 15.

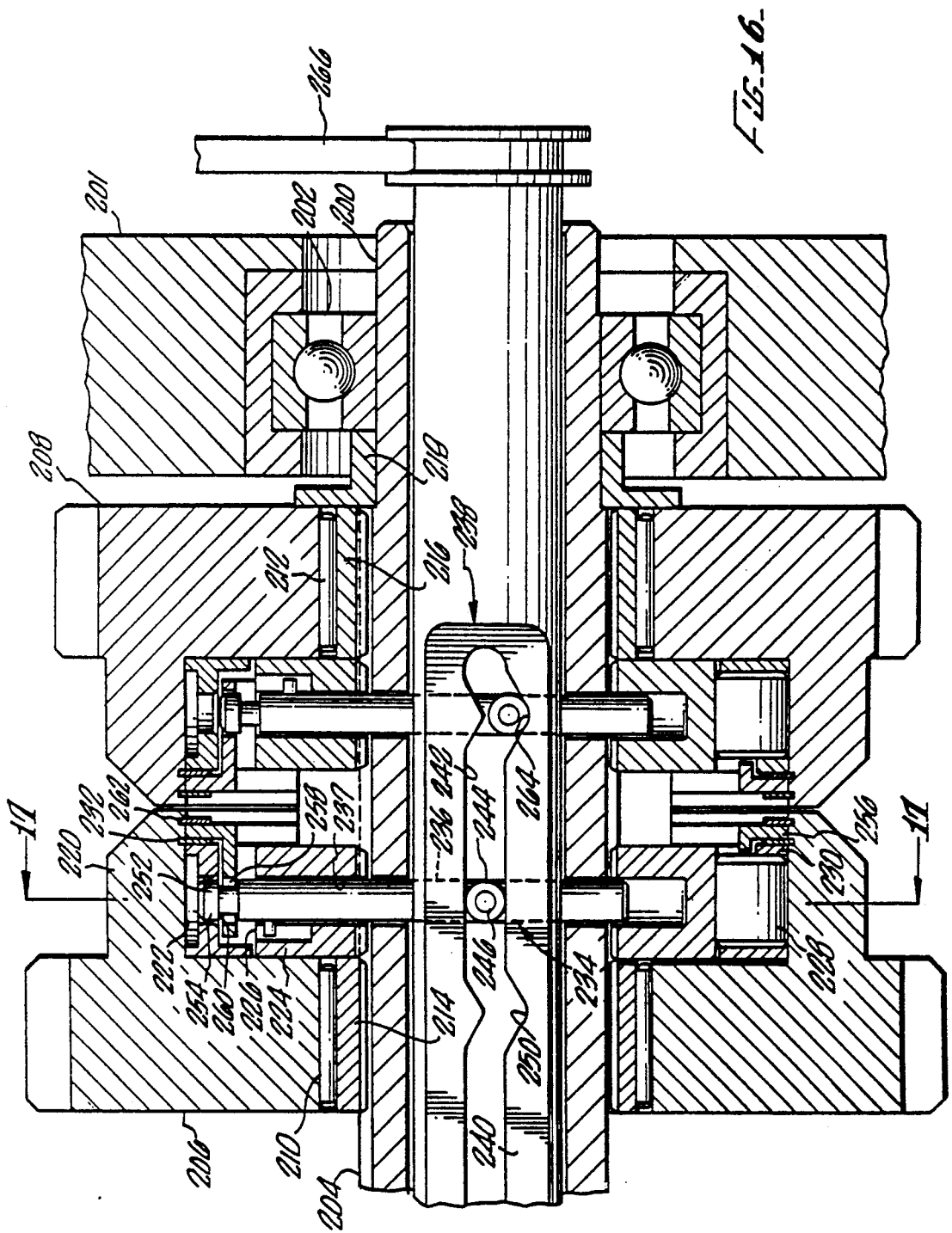

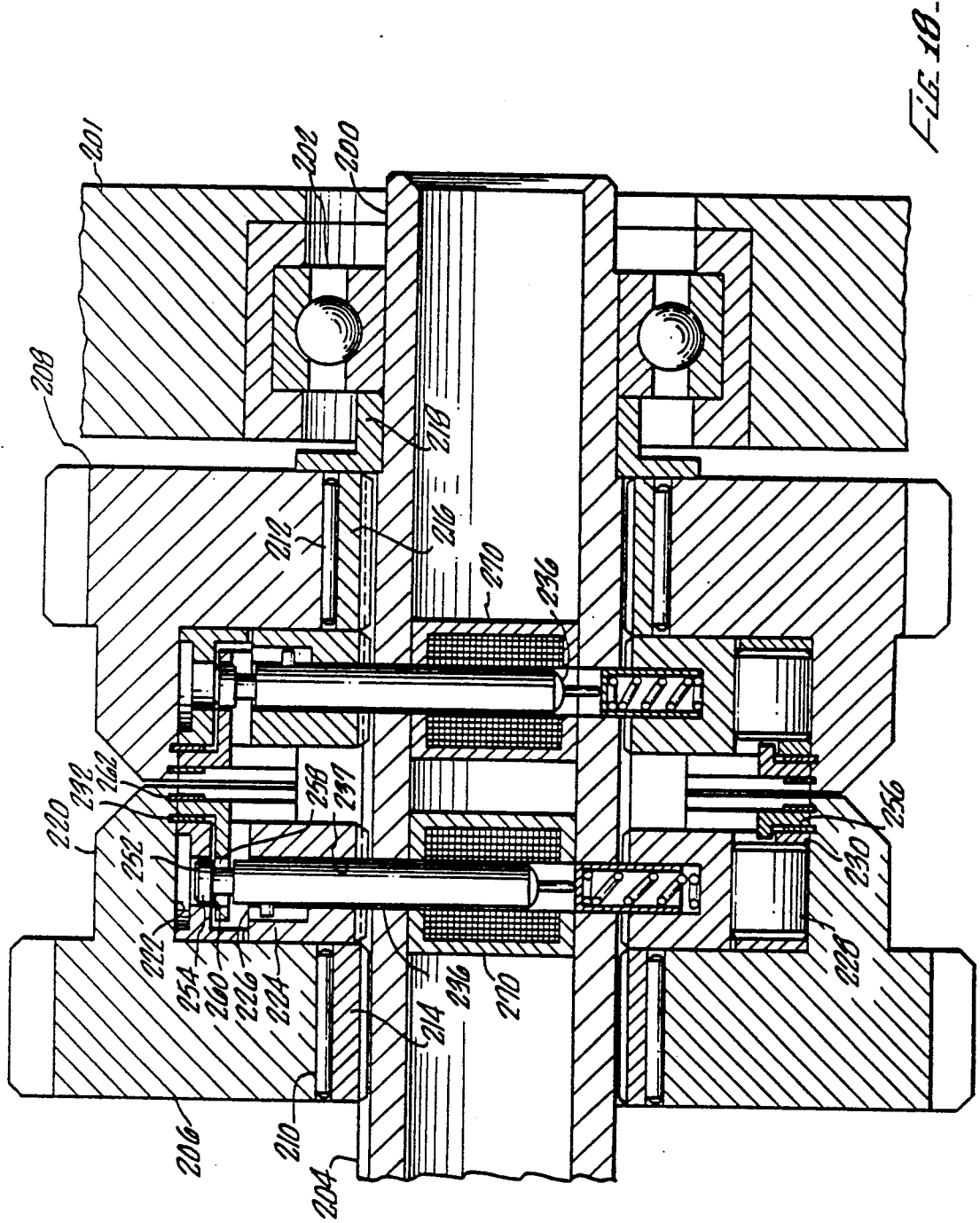

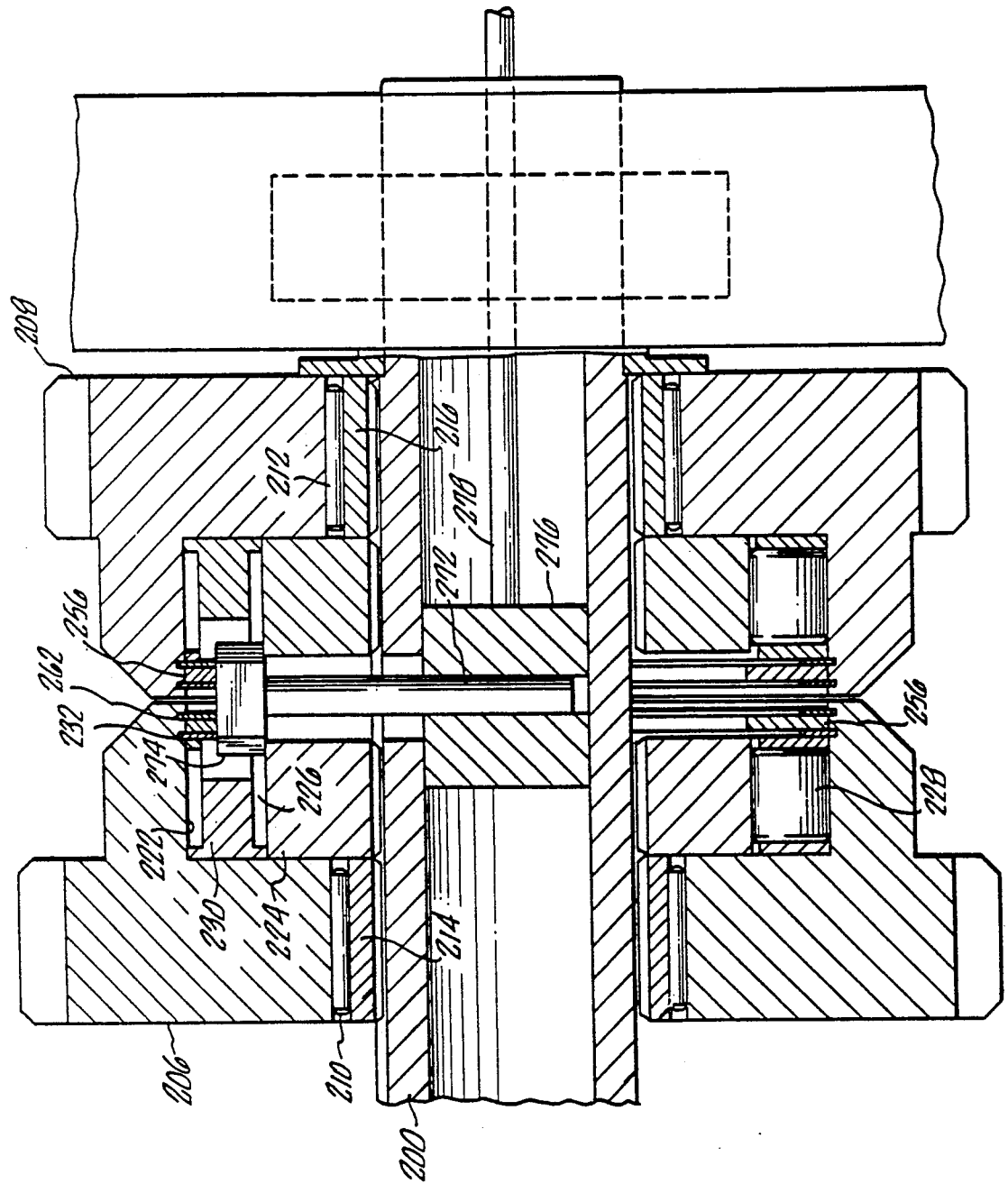

TRANSMISSION

This application is a divisional of Ser. No. 07/647,650, filed Jan. 28, 1991, and now U.S. Pat. No. 5,131,285, issued Jul. 21, 1992, which is a continuation-in-part of Ser. No. 07/333,599, filed Apr. 4, 1989, and U.S. Pat. No. 4,987,790, issued Jan. 29, 1991, which is a continuation-in-part of Ser. No. 07/019,217, filed Feb. 26, 1987, and now U.S. Pat. No. 4,817,451, issued Apr. 4, 1989.

BACKGROUND OF THE INVENTION

The field of the present invention is gear engagement mechanisms, multispeed transmissions using such mechanisms and controls therefor.

A wide variety of devices have long been available for mechanical engagement of rotating components. Where such engagement is to occur with the elements rotating, a variety of coupling mechanisms are frequently employed. In vehicle transmissions, clutches, fluid couplings, friction bands and synchronizing rings are typical. In many circumstances, these devices are quite adequate. However, many such devices are subject to power loss, rapid wear, lack of sufficient engaging strength and lack of sufficient engaging speed.

Mechanisms for automatically locking components have been employed which provide rapid engagement, very substantial engaging strength, and extended wear. One such device is a roller clutch which employs an engagement inner having an inner race, an engagement outer having an outer race and rollers therebetween. One of the two races has cam surfaces which are inclined relative to the other race. The rollers are set within a cage which generally rotates with the cam surfaces. A slight rotation of the cage relative to the cam surfaces results in selected engagement or disengagement of the inner and outer elements through wedging or releasing of the rollers. Such a roller clutch is disclosed in U.S. Pat. No. 3,283,611 to Weismann et al., entitled Positive Drive Differential. The disclosure of the Weismann et al. patent is incorporated herein by reference.

In the Weismann et al. patent, automatic disengagement of the mechanism occurs when differential speeds are experienced by the mechanism. However, employment of such a roller cam engagement mechanism with selective engagement and disengagement in transmission applications has alluded practical utility. Proper control of the cage such that it will remain properly oriented relative to the cam surfaces and yet remain selectively controllable for engagement and disengagement has proven difficult. In transmission applications the control of multiple engagement mechanisms becomes critical as simultaneous engagements can be catastrophic and yet very rapid shifting is desired.

SUMMARY OF THE INVENTION

The present invention is directed to engagement mechanisms using roller clutches with roller cage control devices and to power train control as well.

In a first aspect of the present invention, control of the roller clutches is accomplished by an actuator mechanism located inwardly of a roller clutch. Such an arrangement can provide a more compact assembly and reduce the number of controlling elements required in the actuator. To this end, an outwardly extending pin or pins may be employed which are controlled from a central location rather than about the periphery of the assembly. Several arrangements are contemplated.

In a second aspect of the present invention control means may be employed in a power train arrangement for mechanically, electronically or hydraulically preventing simultaneous engagements and powered drive without full shifting of such engagement mechanisms. Means may be provided to sense a substantially synchronous condition. The wedging elements between the engagement inner and the engagement outer can then be activated to positively couple the mechanism. Means may also sense drive train conditions such as clutch disengagement.

With the foregoing control mechanisms, the wedging mechanism operating as an engagement device may be employed in a substantial variety of devices such as multispeed transmissions as well as clutching mechanisms for rotating couplings in stationary equipment. When employed in mechanisms for shifting gears, such as an automobile transmission, no separate clutching mechanism is necessary for shifting under conventional operation. Yet, added control may be achieved with a separate clutch operation.

In a further aspect of the present invention, process and apparatus are contemplated for using a drive system with engagement of the gearing controlled by roller clutches in association with a clutching apparatus for power shifting in high performance equipment such as racing vehicles and in controlling efficiency.

Accordingly, it is an object of the present invention to provide an improved mechanical engagement mechanism. Other and further objects and advantages will appear hereinafter.

BRIEF DESCRIPTION OF THE DRAWINGS

FIG. 7 is an end view of a roller cage.

FIG. 8 is a plan view of the roller cage of FIG. 7.

FIG. 9 is a cross-sectional view taken along line 9—9 of FIG. 7.

FIG. 15 is a schematic view of a transmission and electronic control system.

FIG. 16 is a cross-sectional side view of a further embodiment.

FIG. 17 is a cross-sectional end view of the embodiment of FIG. 16.

FIG. 18 is a cross-sectional side view of another embodiment.

FIG. 19 is a cross-sectional side view of yet another embodiment.

DETAILED DESCRIPTION OF THE PREFERRED EMBODIMENTS

Figure 1:
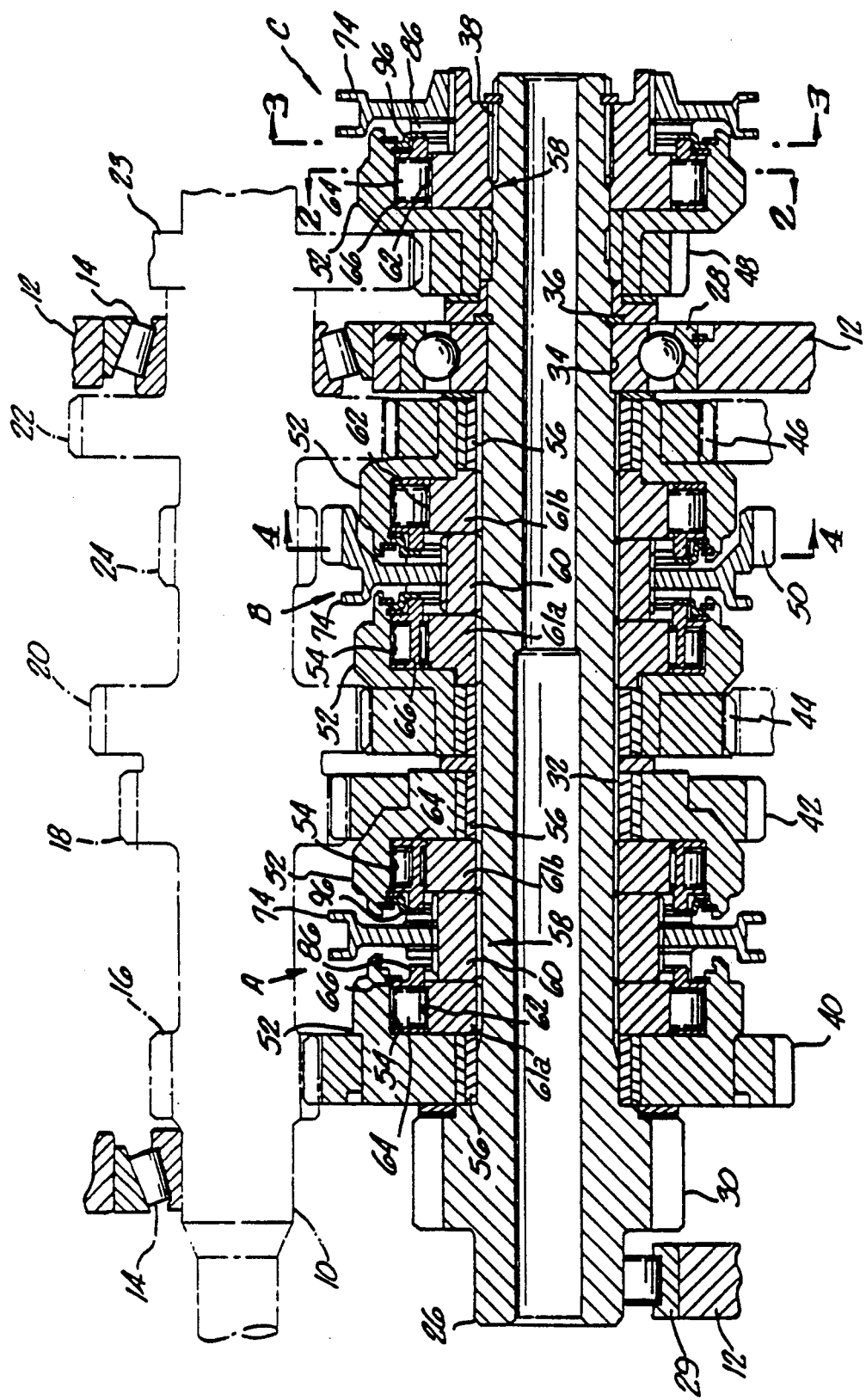
FIG. 1 is a cross-sectional view of portions of a five speed transmission.

Turning in detail to the drawings, FIG. 1 illustrates a five speed transmission. The transmission includes an input shaft 10 having a cluster gear assembly. The shaft 10 is shown to be rotatably mounted in the transmission casing 12 by bearing mechanisms 14. The cluster gear includes a first gear wheel 16, a second gear wheel 18, a third gear wheel 20, a fourth gear wheel 22 and a fifth gear wheel 23. A reverse gear wheel 24 is also located on the cluster gear.

Also included within the transmission is an output shaft 26 which is shown to be rotatably mounted in the transmission case 12. A ball bearing 28 and a roller bearing 29 are illustrated mounting the output shaft 26. The output shaft 26 is shown to include a final drive output pinion 30. Running a substantial length of the shaft 26 are splines 32. An area 34 of reduced diameter is also provided on the surface of the output shaft 26 to receive the bearing 28 in association with a spring clip 36. Additional splines 38 extend at the end of the output shaft 26.

A plurality of elements are mounted on the output shaft 26 including engagement mechanisms and associated gear wheels. There are three sets of engagement mechanisms, A, B, and C. Each of these mechanisms has substantial similarity such that identical and equivalent components of each of these engagement mechanisms will be referred to by the same reference numerals. Certain differences do exist between the engagement mechanisms A, B and C. These differences will be specifically pointed out where appropriate. The gear wheels incorporated on the output shaft 26 are coupled with the gear wheels 16 through 24 to provide five speeds forward and one speed in reverse. The first gear is provided by the gear wheel 16 on the input shaft 10 in constant meshing engagement with a first gear wheel 40 located on the output shaft 26. Similarly, the second gear wheel 18 on the input shaft 10 is in constant meshing engagement with a second gear wheel 42 on the output shaft 26. Similarly, third gear wheel 20, the fourth gear wheel 22 and the fifth gear wheel 23 are in constant meshing engagement with the third gear wheel 44, the fourth gear wheel 46 the and fifth gear wheel 48, respectively, on the output shaft 26. A reverse gear wheel 50 is found to be associated with a portion of the engagement mechanism B. The reverse gear 50 is selectively coupled with the reverse gear 24 on the input shaft 10 through an idler gear which is not shown. In this way, reverse rotation is accomplished.

Figure 10:
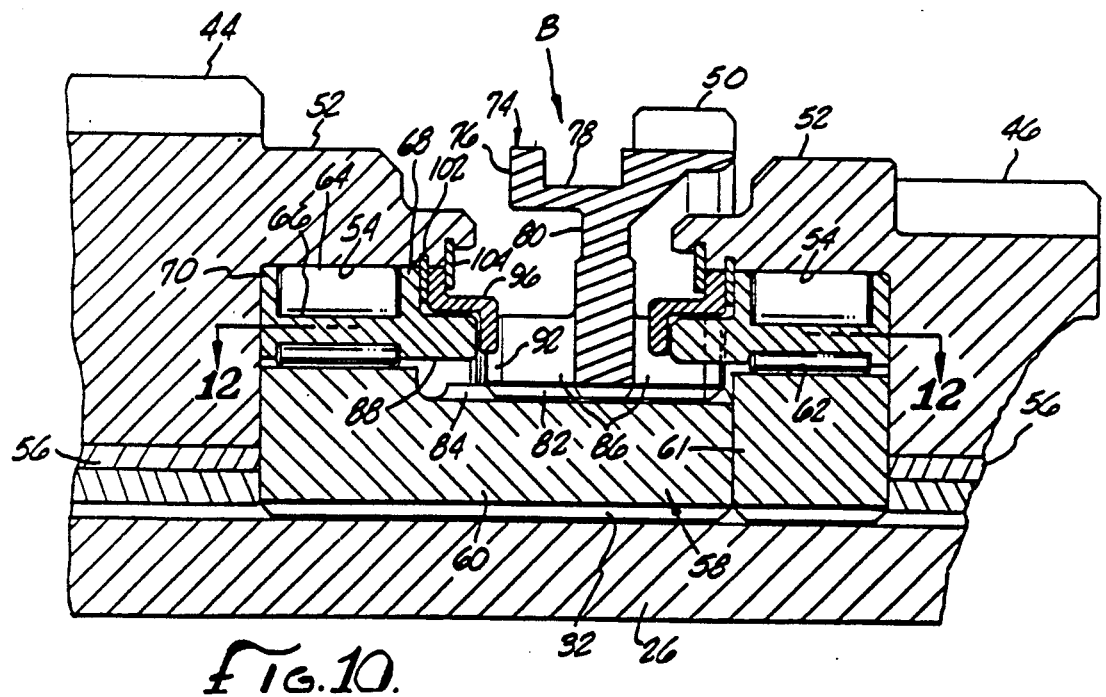
FIG. 10 illustrates in detailed cross section a portion of the device as seen in FIG. 1.

Looking then specifically to the engagement mechanisms, an enlarged drawing of engagement mechanism B is illustrated in FIG. 10. FIG. 10 differs slightly from FIG. 1 in that the gear wheels 44 and 46 are found to be integral with the underlying component while in FIG. 1 separate elements are employed. Clearly, the selection of either a unitary or composite component is a design choice. In FIG. 10, the gear wheel 44 is shown to incorporate an engagement outer 52. The engagement outer 52 constitutes a cylindrical portion extending axially from the gear wheel portion. A similar cylindrical portion 52 is associated with the gear wheel 46. This engagement outer 52 associated with the gear wheel 46 extends axially in the opposite direction from that of the engagement outer on the gear wheel 44. Each of the engagement outers 52 defines a circular outer race 54. The circular outer races 54 are arranged concentrically about the axis of the output shaft 26. Each of the gear wheels 44 and 46 are mounted on bearings 56 such that they and the outer races 54 may rotate freely at differing speeds. This enables the gears to be in constant meshing arrangement with the associated gear cluster on the input shaft 10 when each of the gears 16-24 rotate together.

Figure 2:
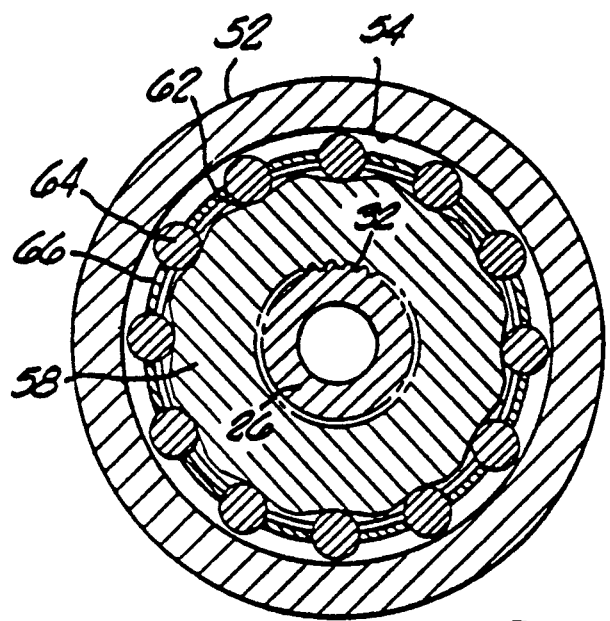
FIG. 2 is a cross-sectional view taken along line 2—2 of FIG. 1.
Figure 3:
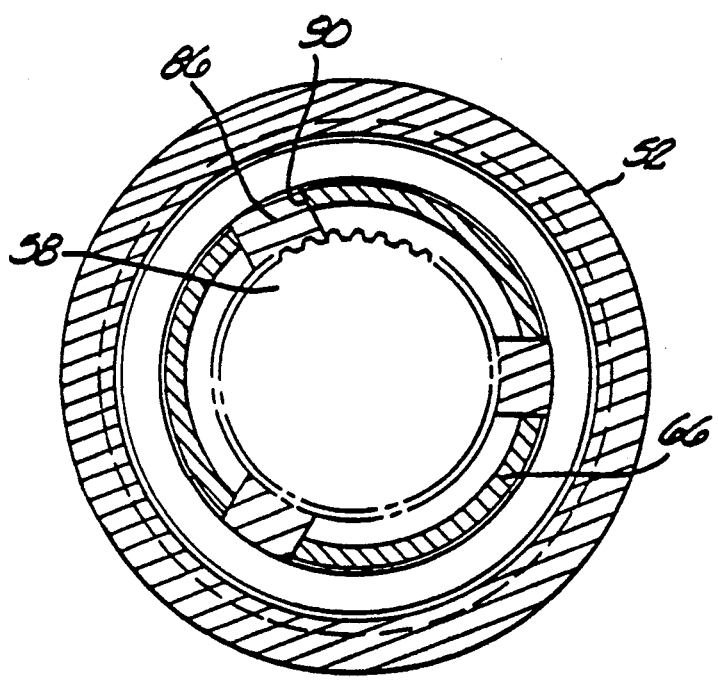
FIG. 3 is a cross-sectional view taken along line 3—3 of FIG. 1.
Figure 4:
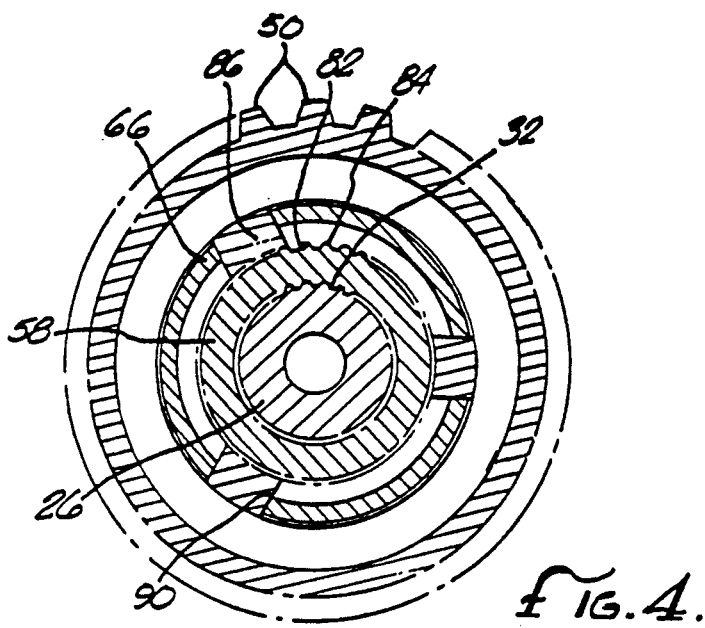
FIG. 4 is a cross-sectional view taken along line 4—4 of FIG. 1.

Located between the engagement outers 52 and fixed to rotate with the output shaft 26 is an engagement inner 58. The engagement inner 58 is shown to be a composite of two ring members 60 and 61 in FIG. 10 which are both internally splined to mate with the splines 32 on the output shaft 26. A design choice variation is illustrated in FIG. 1 where the engagement inner 58 is comprised of three ring members 60, 61a and 61b. The engagement inner 58 is provided with two inner races 62. The profile of the inner races is best illustrated in FIG. 2. the inner races 62 define a plurality of cam surfaces which are inclined relative to the outer races. Two upwardly and outwardly extending cam surfaces are associated with a common depression at a plurality of locations around the inner race (twelve being illustrated in FIG. 2). Each of these surfaces or engagement ramps has an angle of inclination relative to the local tangent of from approximately 2 degrees to 12 degrees. The ramp surfaces thus approach the circular outer race 54 as they extend outwardly from the central depression between paired ramps. This relationship is employed as a means to effect a wedging function to couple the engagement inner and engagement outer.

Located between the outer races 54 and the inner races 62 are wedging elements. The wedging elements in the preferred embodiment are shown to be cylindrical rollers 64. These cylindrical rollers 64 are sized such that they do not contact both the central depression between paired cam surfaces and the outer race at the same time. However, the rollers are also sized such that as they roll up one or the other of the cam surfaces to either side of the central recess, they then engage both the cam surface and the outer race at the same time. Given a relatively shallow angle between the inner and outer races at the contact point with each roller 64, the rollers are wedged between the two races and the races then act as one while one engagement member continues to drive the other engagement member in the same direction. When the driving race decelerates, the rollers may be released. With the rollers in the released condition, the inner and outer races 62 and 54 are uncoupled and rotate freely relative to one another until engagement is again established, most likely on the cam surfaces opposite to those originally engaged if deceleration continues.

To provide control over the rollers 64 and to provide uniform engagement and disengagement of the rollers 64 with the races 54 and 62, a cage 66 extends concentrically between the races 54 and 62. The cage 66 is separately illustrated in FIGS. 7, 8 and 9. The cage 66 includes radially extending flanges 68 and 70. These flanges 68 and 70 locate the cage relative to the outer, cylindrical race 54 such that the cage 66 may remain concentric within the engagement mechanism. Located about the cage 66 between the flanges 68 and 70 are holes 72. The holes 72 are each sized to receive a roller 64. As can be seen in FIG. 2, the rollers are appropriately positioned about the inner race 62 so that the rollers may all be identically placed relative to the cam surfaces. Therefore, rotation of the cage 66 in one direction or the other will cause all of the rollers to climb a cam surface so as to engage the outer race 54 if it is rotating at a differential speed to that of the inner race 62.

Located between the cages 66 is an actuator, generally designated 74. Each of the actuators 74 includes a shift ring 76 having a circumferential groove 78 to receive conventional shifting forks. Inwardly of the shift ring 76 the actuator includes a body 80 having a central bore therethrough with splines 82 to mate with splines 84 located on the outer surface of the engagement inner 58. Thus, the actuator 74 may move axially relative to the engagement inner 58 but must move rotationally therewith.

Figure 5:
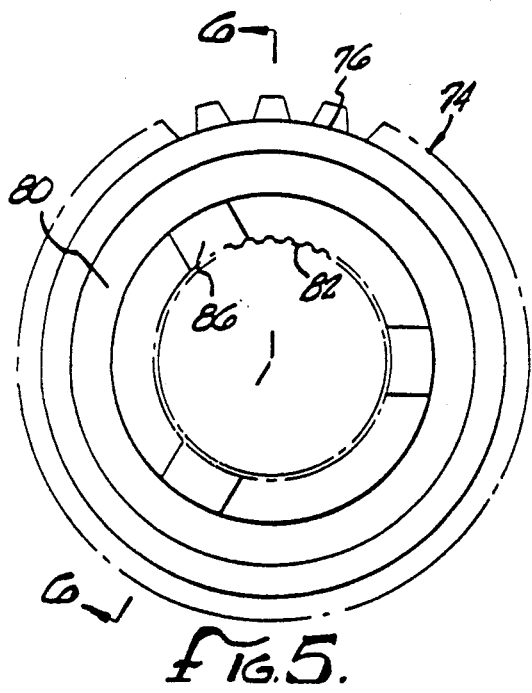
FIG. 5 is an end view of an actuator.
Figure 6:
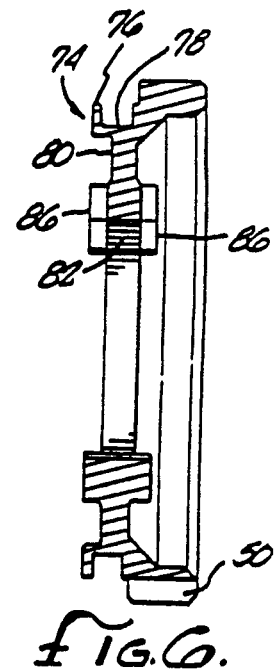
FIG. 6 is a cross-sectional view taken along lines 6—6 of FIG. 5.

Extending laterally from the body 80 of the actuator 74 is an actuator portion 86. The actuator portion 86 in the present embodiment is illustrated to be a dog mechanism extending from the body 80 in the axial direction of the output shaft. There are shown to be three dogs 86 equiangularly located on one side of the actuator body 80. The actuator associated with the engagement mechanism B is illustrated in FIGS. 5 and 6. In both of the engagement mechanisms A and B, there are two sets of actuator portions 86 associated with each actuator 74, one to each side of the actuator body 80. In engagement mechanism C, only one such set of actuator portions 86 is employed.

Cooperating with the actuator portion 86 of the actuator 74 is an actuator portion 88 located on the cage 66. The actuator portion 88 forms a cylindrical flange having slots 90 at three locations equiangularly spaced about the flange 88. These slots 90 cooperate with the dogs or actuator portions 86 to selectively engage and disengage with movement of the actuator 74. This cooperation may be seen in side view in FIG. 10 where the right dog 86 is shown to be engaged with a slot of the flange 88. The left dog 86 is not so engaged. This positioning is illustrated in plan in FIG. 12A. The right cage 66 is shown to be angularly held by the associated dog positioned in the slot. The left cage 66 is shown to be displaced form an alignment between the left dog and the left slot. FIG. 12C illustrates the dogs centrally positioned such that both slots 90 are engaged. FIG. 12F illustrates the reverse of FIG. 12A with the shift completed. FIG. 12B and the sequence including FIGS. 12A, B and C illustrate the cooperation between the left dog 86 and the slot 90. Associated with the first dog or actuator portion 86 is a beveled surface 92 with a similar beveled surface 94 associated with the slot 90. These beveled surfaces 92 and 94 are inclined to the direction of relative movement between the actuator 74 and the cage 66. Consequently, a camming action is shown to take place as seen from the sequence of FIGS. 12A, B and C. This action aligns the dogs 86 and slots 90 which in turn angularly position the entire cage 66.

Figure 11:
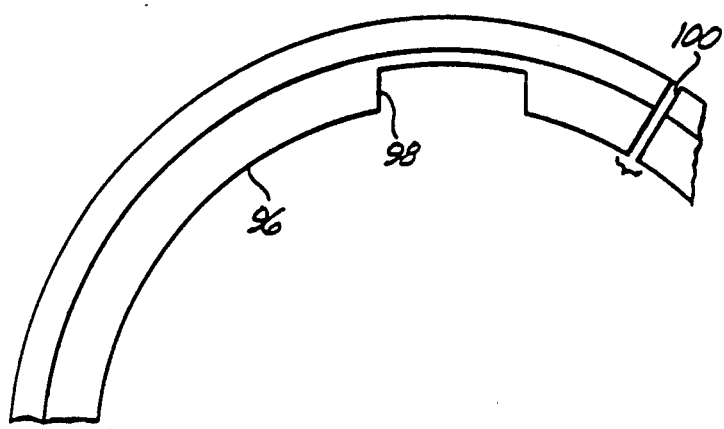
FIG. 11 is an end view of a control member.

Associated with the engagement mechanisms are control means for preventing disengagement of the actuator portions. In the embodiment of FIG. 1 and FIG. 10, each of the paired dogs 86 and slots 90 are shown to have a control member 96 located between the actuator 74 and the cage 66. These control members 96 are shown to be rings, one of which is partially illustrated in FIG. 11. Each of the rings 96 includes ports 98 which align with the dogs 86 to allow movement therethrough. The rings may be split at 100 and spring biased to create appropriate friction for urging of the ring 96 against the rotating engagement outer. The rings 96 are held axially relative to each of the engagement outers by spring clips 102 and 104. The operation of the control means is best illustrated in FIG. 12. The actuator portions 86 of the actuators 74 include undercut portions 106 inwardly of the inclined surfaces 92. The undercut portions define an engagement shoulder 108 which faces away from the cage 66. The control member 96 at the edge of the ports 98 defines locking shoulders to engage the engagement shoulders of the control members 96. As illustrated in FIG. 12D, under certain circumstances the locking shoulders and engagement shoulders cooperate to prevent retraction of the actuator portions 86.

Looking again to FIG. 1, certain differences are apparent among each of the engagement mechanisms A, B and C. Engagement mechanism A controls first and second gears. First gear is shown not to employ a control ring 96. The lack of a ring 96 on first gear enables the actuator 74 to be engaged with the associated cage 66 with the vehicle stopped. A conventional control means may be employed to insure against engagement of first gear under inappropriate condition. A conventional lock-out mechanism may be employed including a solenoid controlled stop requiring the drive train clutch to be disengaged before first gear may be selected.

Exploring further differences, engagement mechanisms A and B are dual mechanisms each controlling two gears. Engagement mechanism C is shown to be a single control mechanism controlling only fifth gear 48. Finally, engagement mechanism B also incorporates the reverse gear 50 discussed above.

Looking then to the operation of the first embodiment as described in FIGS. 1 through 12, first gear is selected by moving the actuator 74 of the engagement mechanism A to the right as seen in FIG. 1. As stated before, a conventional solenoid mechanism may be employed to prevent such movement unless the drive train clutch is disengaged. As the actuator 74 of the engagement mechanism A is moved to the right, the dog 86 associated with the slot 90 of the cage 66 adjacent the first gear is disengaged. The disengagement allows the cage 66 to rotate relative to the engagement inner 58. This movement of the cage 66 occurs because of the constant meshing of the first gear wheel 40 with the associated first gear wheel 16 located on the input shaft. As the gear wheel 40 rotates, sufficient drag is experienced between the cage 66 and the outer race 54 such that the cage 66 and the rollers 64 rotate relative to the engagement inner 58. Only a small degree of rotation is possible before the rollers 64 roll up the associated cam surfaces or ramps bringing the engagement inner 58 and the engagement outer 52 into a mutually engaged relationship. With all of the remaining engagement mechanisms arranged with the actuator 74 engaging the cages 66, only first gear is engaged between the input shaft and the output shaft. Normal power may then be directed through the transmission. Under decelerating conditions, the rollers 64 disengage from the inner and outer races and then instantaneously reengage on the opposite ramp. One may then go through the gears in a like manner.

The engagement inner 58 and the engagement outer 52 may experience inelastic impact when engaging through the rollers 64. Some damping may be provided between the inner 58 and the outers 52 through the fit between components or as described below with reference to FIGS. 13 and 14. This would alleviate the possibility of the engagement mechanism bouncing out of engagement.

FIG. 12, illustrating the engagement mechanism B, provides the greatest detail in the shifting operation. FIG. 12A illustrates an initial condition where the engagement mechanism on the left is engaged and the engagement mechanism on the right is disengaged. Engagement occurs when the cage 66 is allowed to rotate relative to the actuator 74 and in turn the engagement inner with its cam surfaces. The dogs 86 and the slots 90 are arranged such that when engaged, the rollers 64 are disengaged between the outer race 54 and the inner race 62. It should be noted that the control ring 96 is never disengaged by the dog 86. This arrangement insures that the dog 86 may always fit within the port 98.

Figure 12A:
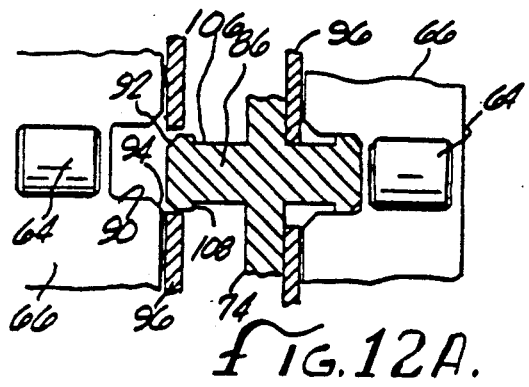
FIG. 12 is a cross-sectional view taken along line 12—12 of FIG. 10 showing an actuator in a plurality of positions in views A through F.
Figure 12B:
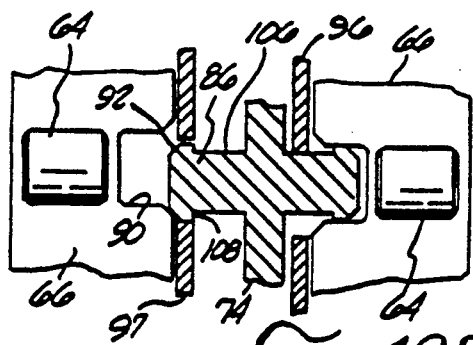
Figure 12C:
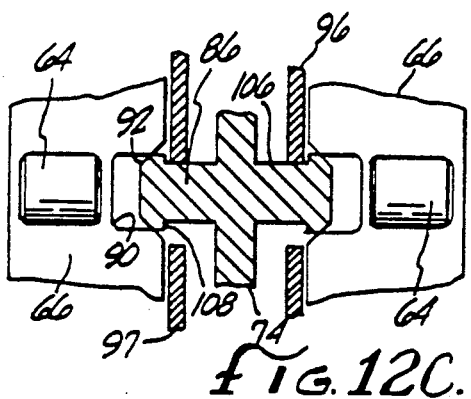
Figure 12D:
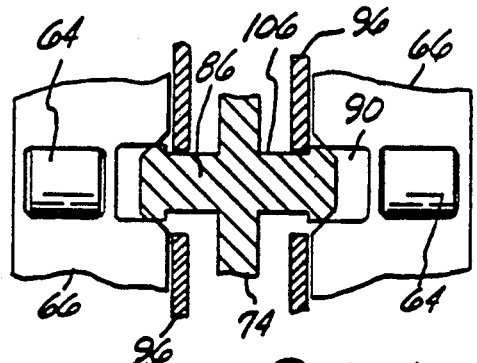
Figure 12E:
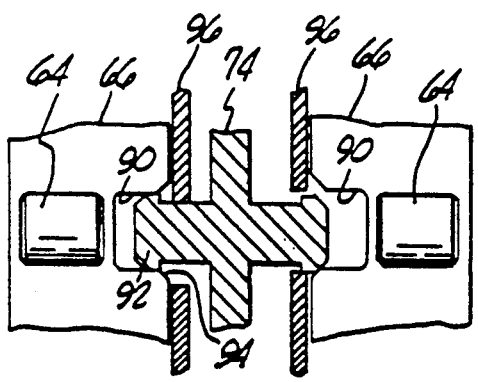
Figure 12F:
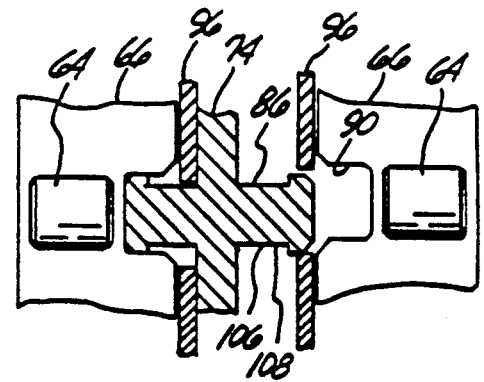

As shifting occurs, in sequence through FIGS. 12A, B and C, the left cage 66 is engaged at the beveled surfaces 92 and 94 and forced into alignment with the dog 86 when input torque is interrupted. At this time, the rollers are positioned between the opposed ramps and the outer race 54 is disengaged.

As shifting continues toward the next gear, the gear on the right in FIG. 12, the control ring 96 is engaged between the locking shoulder and the engagement shoulder to prevent the dog 86 from being retracted from the right slot. This condition will exist until a substantially synchronous condition is reached between the engagement outer 52 and the engagement inner 58. At such time as the rotating engagement elements approach synchronous speed, the control ring 96 will cross from engagement on one side to engagement on the other side of the dog 86. During the interim between engagement, the dog may be retracted from the slot 9 as sequentially illustrated in FIGS. 12D, E and F such that the right-hand engagement mechanism becomes engaged. The control ring 96 is operated under the influence of the friction between the control ring itself and the engagement outer. The control ring is arranged with sufficient friction such that it is biased to move with the associated engagement outer. Such movement is limited by the lack of disengagement between the dogs 86 and each of the control rings 96. However, positive engagement between the locking shoulders and the engagement shoulders can occur until the engagement outer momentarily approaches a synchronous speed with the engagement inner. At this point, the control ring 96 is urged in the opposite angular direction relative to the engagement inner with which the actuator is angularly fixed. At this moment, the engagement between the ring 96 and the dog 86 is relieved and shifting may occur.

To achieve shifting, the conditions controlling the control ring 96 may be left completely to the operator. Under such circumstances backing off the accelerator while shifting will free the appropriate dog for engagement. Electronic means may also be provided to accomplish the same function in association with movement of the shift lever. For example, the ignition may be momentarily disabled during an upshift such that the appropriate conditions exist to unlock the shifting dog.

Figure 13:
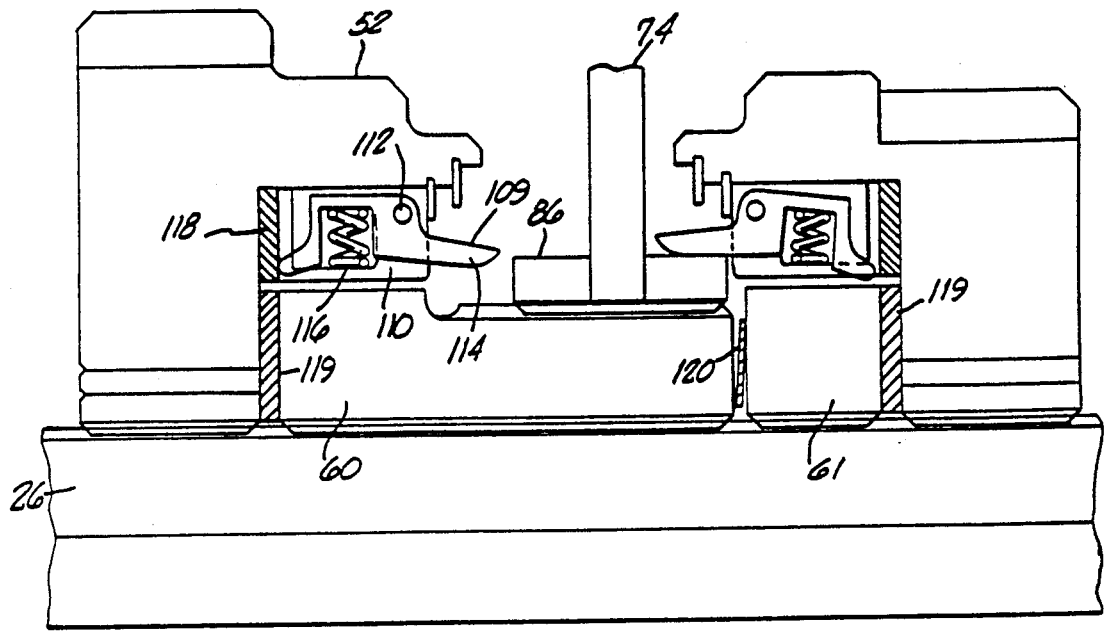
FIG. 13 illustrates an alternate embodiment having a controllable cage drag mechanism in schematic cross section.
Figure 14:
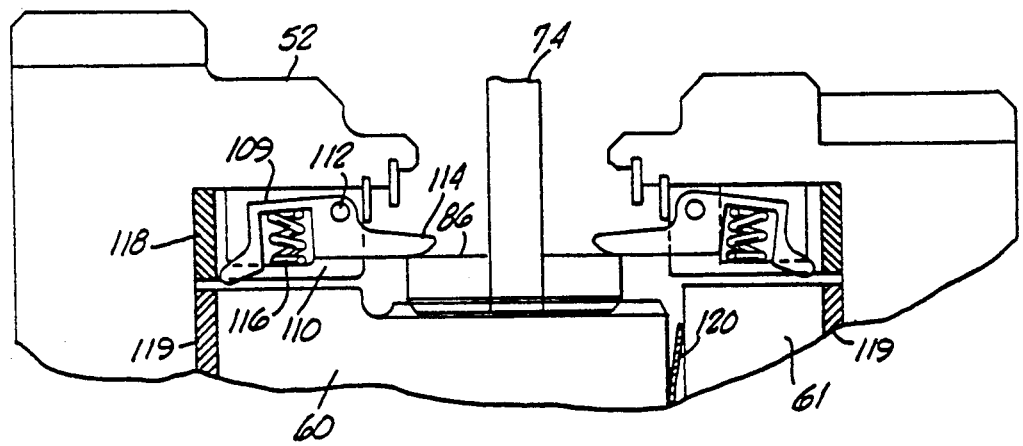
FIG. 14 illustrates the device of FIG. 13 with the actuator reoriented.
Figure 11:
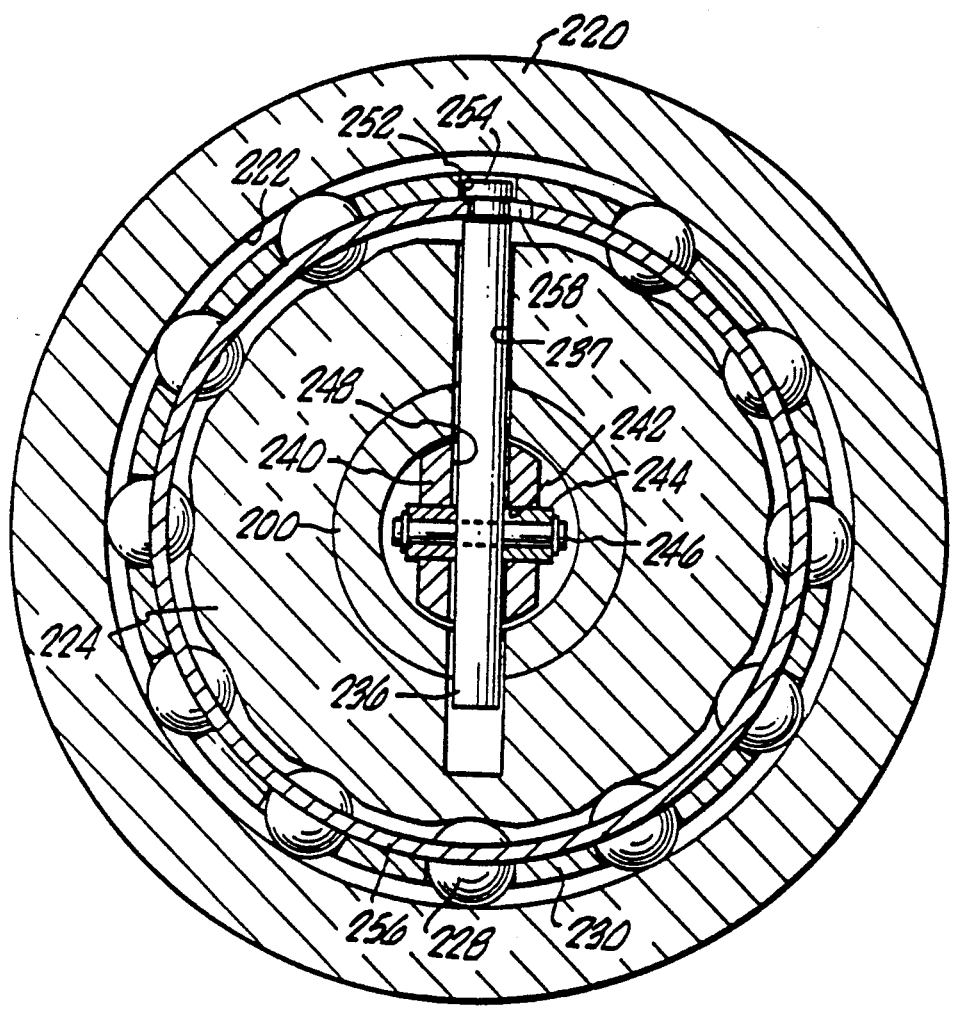

Looking next to the embodiment of FIGS. 13 and 14, controllable friction cage drag is illustrated as is constant friction drag between the engagement inner 58 and the engagement outer 52. Under certain harsh engagements, engagement mechanism bouncing can occur causing rapid loading and unloading of the coupling. Supplying a sufficient amount of drag between the cage and the engagement member having the cylindrical race, in this case the engagement outer, or between the engagement inner and engagement outer will critically dampen the oscillation and prompt smooth engagement. This drag, though beneficial upon engagement has a detrimental side effect during the neutral freewheeling condition. That is of wasted horsepower or inefficiency. Hence the device illustrated in FIGS. 13 and 14 shows a means for switching the friction on (L.H. side of FIG. 13) and off (R.H. clutch).

The actuator 74 incorporates an actuating portion 86 to receive a control member 109 pivotally mounted to a cage 110 about a pivot 112. An extension 114 of the control member 109 includes a ramp to be mechanically linked with the portion 86. The mechanism 109 includes a spring 116 to bias the control member 109 into engagement with a friction member 118. When the actuator portion 86 is withdrawn from the control member 109 to release the cage 110, the spring 116 brings the member 109 into engagement with the friction member 118 as can be seen on the left side of FIG. 13. This forces the friction member 118 to engage the engagement outer 52 resulting in drag on the cage. The friction member 118 is keyed to the cage 110. The mechanism 109 is held away from the friction member 118 in the R.H. clutch in FIG. 14 disabling the cage drag mechanism in the neutral freewheeling condition. FIG. 14 illustrates the double neutral position of the shift actuator with both drag devices disabled.

Also illustrated in FIGS. 13 and 14 is constant friction drag between the engagement inner and the engagement outer 52. This is provided by two friction discs 119 located between he left engagement outer 52 and the ring member 60 of the engagement inner 58 and between the right engagement outer 52 and the ring member 61. Controlled normal forces between the friction discs 119 and the associated inner 58 and the outers 52 is accomplished by a Belleville spring 120 between ring members 60 and 61. The constant friction drag mechanism may be employed with the controllable friction cage drag. Alternately, one or the other may be employed independently in a design. Further, the fit of the components, such as between the cage 110 and the engagement outer 52, or additional friction elements may be employed to create constant cage drag relative to the engagement outer having the cylindrical race.

Each of these mechanisms contributes to avoid any rebounding between components resulting from inelastic impact when engaged.

Looking to FIG. 15, an electronic control system is employed to provide the control means for preventing shifting without the rotating components being substantially synchronized. Schematically illustrated is an engine 121 and a hydraulic coupling or torque converter 122. Actuator mechanisms are illustrated schematically as 124, 126, 128 and 130 and include actuator control mechanisms such as solenoids which can be controlled by electrical input. In this instance, an input shaft 132 mounts the actuator mechanisms. A gear cluster on a lay shaft is shown to be continuously meshing with gear wheels located on the input shaft 132. Output is through a drive shaft 136.

A computer 137, common to the auto industry, is employed to sense input speed through line 138, output speed through line 140 and selected conditions of the engine such as engine speed through line 142 and manifold vacuum through line 144. Several outputs are provided from the computer including an engine control 146 which may control throttle or ignition to establish the appropriate shifting condition and shift commands through lines 148, 150, 152 and 154. Input from a selection mechanism common to automatic transmissions is illustrated schematically at 156.

FIG. 16 illustrates an actuator mechanism located inwardly of the clutching mechanism in a transmission having constant mesh gearing with roller clutching. Specifically illustrated is an output shaft 200 which may have a similar role to the output shaft 26 of FIG. 1. The output shaft 200 is hollow and rotatably mounted to the transmission case 201 in bearings 202. A substantial variety of components may be mounted to the shaft and the shaft may instead be employed as an idler shaft or input shaft as may be required in any given transmission design. The outer surface of the shaft 200 includes splines 204 to angularly fix components to the shaft.

In FIG. 16, two gears 206 and 208 are illustrated. The gears are intended to be in constant mesh with gears located on the input shaft of the transmission (not shown). Engagement of the gears 206 and 208 is accomplished through roller clutches associated therewith. The gears 206 and 208 are mounted to rotate relative to the hollow shaft 200 on needle bearings 210 and 212, respectively. These bearings employ the gears 206 and 208 as the outer race and splined ring elements 214 and 216 as the bearing inner races. The rings 214 and 216 are angularly fixed to the shaft 200 by means of the splines 204. Location of the gears 206 and 208 axially on the shaft 200 are accomplished by spacing elements. A collar 218 is shown between the gear 208 and the bearing 202 to maintain the gear 208 in proper axial orientation.

Looking to the roller clutch mechanisms for controlling engagement of the gears 206 and 208 with the hollow shaft 200, the gear body 206 integrally includes an engagement outer 220. The engagement outer 220 defines an outer race 222. An engagement inner 224 is concentrically arranged with the engagement outer 220. The engagement inner has a splined bore to engage the splines 204 on the shaft 200. Consequently, the engagement inner 224 is fixed to rotate with the shaft 200. The engagement inner 224 includes an outer peripheral surface defining an inner race 226. As can best be seen in FIG. 17, the inner race 226 includes cam surfaces which are inclined relative to the outer race 222 to create spaces of decreasing width for binding wedging elements therebetween. The inclined surfaces extend in either direction from points of minimum diameter such that the clutch operates in both rotational directions. Located within the spaces between the outer race 222 and the inner race 226 are wedging elements defined by rollers 228. Thus, with relative rotation between the outer race 222 and the inner race 226 with the rollers able to move in the space therebetween, the rollers will move to wedge themselves between races and effect engagement of the gear 206 with the shaft 200.

Positioned about each of the rollers 228 is a cage 230. The cage 230 allows free rotation of the rollers 228 but provides sufficient constraint to prevent the rollers from wedging between the outer race 222 and inner race 226 when the cage is held in a fixed position relative to the inner race 226. The cage 230 is constrained from axial movement on one side by the gear 206 and the other by a spring clip 232. The spring clip 232 is preferably dished so as to place the cage under frictional engagement with the gear 206. Alternately, a wave washer might be employed between the spring clip 232 and the cage 230. The friction acts to assist in engagement and dampen angular vibration and chattering of the components during operation.

Control over the engagement of the gear 206 is accomplished by an actuator, generally designated 234. The actuator 234 includes a shift pin 236. The shift pin 236 extends outwardly from the hollow portion of the shaft 200 to the roller clutch and specifically to the cage 230. A bore 237 is provided through the engagement inner 224 as well as through the wall of the hollow shaft 200. This mounting allows the shift pin 236 to move longitudinally through the bore 237. The actuator 234 also includes a shift member, generally designated 238. The shift member 238 extends longitudinally through the hollow shaft 200 and is able to move back and forth therein. As can best be seen in FIG. 17, a central area of the shift member 238 includes milled sides 240. Located through the shift member 238 in the location of the milled sides 240 is a linear cam 242. Cooperating with the cam 242 is a cam follower 244. The cam follower 244 is defined by a roller mounted upon a shaft 246 extending transversely of the shift pin 236. The cam follower 44 is sized to fit within the cam 242 such that substantial longitudinal play in the shift pin 236 is not permitted.

To assemble and operate the actuator 234, a central slot 48 which is roughly the width of the shift pin 236 extends at least through the length of the cam 242. If the central slot 248 does not extend to one end of the hollow shaft 200, the actuator 234 may be assembled by inserting the shift pin 236 into the central slot 248 with the pin rotated 90°. In this instance, the cam followers 244 cannot be any wider than the central slot 248 and preferably no wider than the shift pin 236.

The cam 242 extends generally perpendicularly to the pin 236. A single deviation from that extent is accessible to the shift pin 236 at a cam segment 250. The generally straight portion of the cam 242 corresponds to a neutral position of the shift pin 236. The deviation at the segment 250 corresponds to a position of the shift pin 236 allowing engagement of the gear 206.

The cage 230 includes a portion cooperating with the actuator mechanism. A portion of the shift pin 236 in turn cooperates with the actuator portion of the cage 230. In the present embodiment, the actuator portion in the cage 230 is a hole 252. On the shift pin 236, the actuator portion cooperating with the hole 252 is a head 254 on the shift pin 236. As with other embodiments, the two cooperating actuator portions 252 and 254 provide a tapered fit. That is, the head 254 has a bevel about the end thereof while the hole 252 has a like chamfer. By providing this tapered fit, the head 254 of the shift pin 236 may be configured such that it will always engage the hole 252 regardless of the position of the cage 230 along its full neutral angular range of travel. Again because of the tapered fit, as the shift pin 236 advances into the cage 252, the cage will then be forced into a fixed central position corresponding to a neutral or disengaged position for the roller clutch.

Positioned about the hole 252 and head 254 is a control member 256. The control member 256 is preferably arranged in a ring extending fully about the roller clutch. At the actuator, a hole 258 is provided to receive the shift pin 236. The control member 256 defines by its structure surrounding the hole 258 a locking shoulder. The head 254 is coupled with the main body of the shift pin 236 by means of a narrowed section defining an engagement shoulder 260. When the control member 256 and the shift pin 236 are not properly aligned to place the head 254 centered in the hole 258, there is a locking of the shift pin 236 through engagement of the engagement shoulder and locking shoulder. Only during substantially synchronous rotation of the gear 206 with the shaft 200 will the shift pin 236 be alignable for retraction from the cage 230. To insure proper movement of the control member 256, friction engagement with the gear 206 is accomplished through the locating spring clip 262. The spring clip 262 is dished like the spring clip 232 to increase friction for forced angular movement and damping of vibration. Assembly of the control member 256 onto the shift pin may be done so with the cam follower 244 still aligned parallel with the slot 248. As can be seen from FIG. 16, the bore 237 for the pin 236 extends with substantial clearance at the bottom end of the pin such that the control member 256 can be positioned. Alternately, the member 256 might be slightly deformed for placement or the hole 258 may be a slot.

An identical but reversed mechanism is incorporated with the gear 208. Consequently, the same reference numbers have been applied for convenience and brevity. The cam 242 is employed with both shift pins 236. A second deviation 264 is located on the cam 242 in a region accessible to the pin 236 associated with the gear 208. As can be seen from FIG. 16, three positions are provided for the two shift pins 236 by the cam 242. As shown in FIG. 16, a first position is presented whereby the gear 206 is held in neutral through the extension of the shift pin associated therewith. At the same time, the gear 208 is engaged because of the retraction of the shift pin 236 at the deviation 264. Small movement of the shift member 240 in either direction will result in both shift pins 236 extending into the cages 230 to place both gears 206 and 208 in neutral. Substantial movement of the shift member 238 to the right as seen in FIG. 16 will result in the opposite status of the roller clutches, i.e., gear 206 is engaged and gear 208 is held in neutral. Additional deviations along the cam 242 may be employed to accommodate additional gear assemblies. With no two deviations alignable at the same time with two shift pins, it becomes impossible to have more than one gear engaged at a time. The location of the shift member 238 for control of the transmission gears is determined by placement of a shift fork 266 engaged with the shift member 238 where it extends from the hollow shaft 200.

FIGS. 18 and 19 disclose internal shift mechanisms, providing alternate embodiments to the device of FIGS. 16 and 17. Where similar reference characters are employed, they denote similar elements among the several embodiments. In FIG. 18, the pins 236 are each electrically controlled by a shift member which is a solenoid 270. Alternatively, pneumatic or hydraulic cylinders may be used. Such devices are all common to transmissions for actuating elements therein.

In FIG. 19, an internal device, an actuator, is disclosed for shifting. Rather than a pin moving along its length, an arm 272 controls a dog 274 to operate axially in the transmission like the embodiment of FIG. 1. A block 276 is moved back and forth as controlled by a shift linkage 278 along the axis of the hollow shaft 200. This linkage may be manually or automatically controlled.

Figure 20:
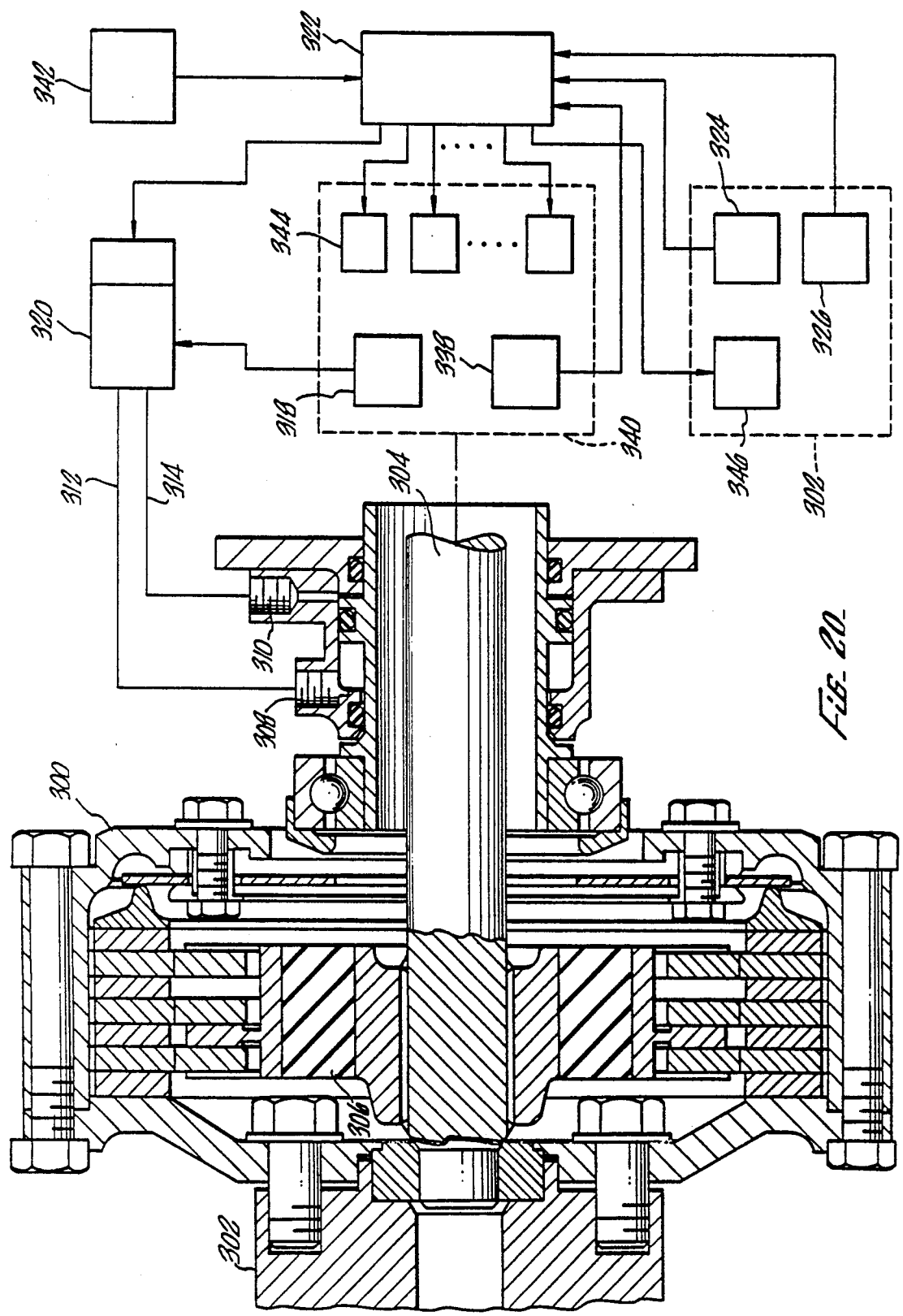
FIG. 20 is a schematic diagram of a control system and clutch for association with a transmission as disclosed in one of the above embodiments.

Turning to FIG. 20, a mechanism is disclosed for the power shifting of a transmission such as disclosed in the embodiments discussed above. In order to achieve power shifting, however, the control members 96 (in the first embodiment) and 256 (in the embodiment of FIG. 16) are preferably omitted.

FIG. 20 discloses a clutch 300 of conventional design. The clutch 300 is coupled with the output of an engine 302 at one end and with the transmission by means of a shaft 304 at the other. The clutch is preferably multiplate, as shown, includes a damper 306 to reduce shock loads on the drive train. The clutch 300 is hydraulically actuated in both engaging and disengaging the unit. Two inputs 308 and 310 are provided for hydraulic fluid by means of lines 312 and 314, respectively. A piston 316 is driven in the appropriate direction by means of pressurized hydraulic fluid provided selectively through the lines 312 and 314. Pressurized hydraulic fluid is provided by a pump 318 through a variable flow rate, electrically controlled hydraulic valve 320.

To control the shifting, a computer or central processing unit 322 is employed. The central processing unit receives an engine speed signal from a sensor 324 at the engine 302. Further, data is received from a sensor 326 which is indicative of generated power. This sensor may measure torque directly through a strain gauge, manifold pressure by a pressure gauge, or throttle opening by a position sensor. A strain gauge measuring torque would provide the most accurate indication of the state of the engine regarding generated power. Input is also provided to the central processing unit 322 from a transmission output shaft speed sensor 338 located in the transmission 340. Additional input to the central processing unit 322 is made by a selector switch 342 as commonly employed with modern automatic transmissions. The selector switch 342 may also be run automatically responsive to engine speed, vehicle speed, generated power or other conventional parameters. In turn, the central processing unit 322 controls the valve 320, actuator solenoids 344 and an engine power interrupt 346. The actuator solenoids 344 may be employed to individually control each roller clutch. Alternatively, one actuator solenoid may be employed to run a single shift member such as shift member 238 in FIG. 16. The power interrupt 346 may be a switch disabling the ignition or fuel injector valves or a throttle opening control using a stepper motor or the like. In either instance, instantaneous control of power can be available to rapidly unload the power train during shifting.

To perform power shifting through use of the foregoing mechanism, the following sequence is performed. This sequence may occur in seriatim or with certain steps performed simultaneously. The concept of power shifting is to maintain the engine momentum during shifting. However, the shifting must be controlled so as not to damage the drive train due to shock loading resulting from changes in transmission ratio. By maintaining such a maximum engine speed, the momentum of the engine is available to further accelerate the vehicle when the next higher gear is selected. In this instance, engagement of the roller clutches with the gearing and driven shaft running at substantial differential speeds is undertaken in a controlled manner.

A power shift begins through selection of a gear by the selector 342. As stated above, the selector may be manually actuated or may result from an automatic program within the central processing unit 322, or elsewhere, responsive to engine and speed parameters. The central processing unit 322 is preferably continuously monitoring engine speed through the sensor 324, generated power through the sensor 326 and transmission output speed through the sensor 338. These operating parameters enable the central processing unit 322 to select preprogrammed rates for driving the clutch 300 in either direction to engage or disengage same. Through a comparison of the engine speed and the transmission output speed, the central processing unit 322 is able to determine the differential speed across each of the roller clutches. With a substantial speed differential across a roller clutch to be engaged, a more rapid clutch disengagement would be preferable. A less rapid clutch engagement might also be preferred under such conditions. Absolute engine speed may also be considered in selecting clutch rate under the condition of excessively low engine speed. The state of power demand on the engine determined by one of high torque measurements, low manifold vacuum and open throttle setting would demand a higher rate of clutch disengagement and engagement. As the information is virtually continuously supplied to the central processing unit 322, roller clutch lock may be sensed and the clutch 300 would be instantaneously changed from a disengaging condition to an engaging condition. Thus, a variety of rates are available depending upon conditions; and the system is able to stop at only a partially disengaged clutch when conditions permit.

With the foregoing available to the central processing unit 322, a signal to shift causes the central processing unit 322 to cut power through a signal to the power interrupt device 346. The appropriate solenoid 344 is powered to drive the shift mechanism on the engaged gear to a neutral condition. A signal is also provided to the electrically controlled valve 320 to initiate disengagement of the clutch 300 at the preprogrammed rate. Where appropriate, neutral is sensed through feedback from the solenoid 344 or other conventional device. If the same mechanism is employed for disengaging the lower gear and engaging the higher gear, such neutral sensing is not required. The appropriate solenoid 344 is then actuated to engage the next higher gear. This engagement is undertaken very promptly upon initiation of the shifting sequence. Consequently, the engine is barely beginning to slow but the drive train is unloaded. With the roller clutch associated with the higher gear positioned for engagement, power is restored to the engine and the clutch 300 is driven at the appropriate preprogrammed rate toward full engagement. In this way, engine momentum may be reserved for acceleration.

Figure 21:
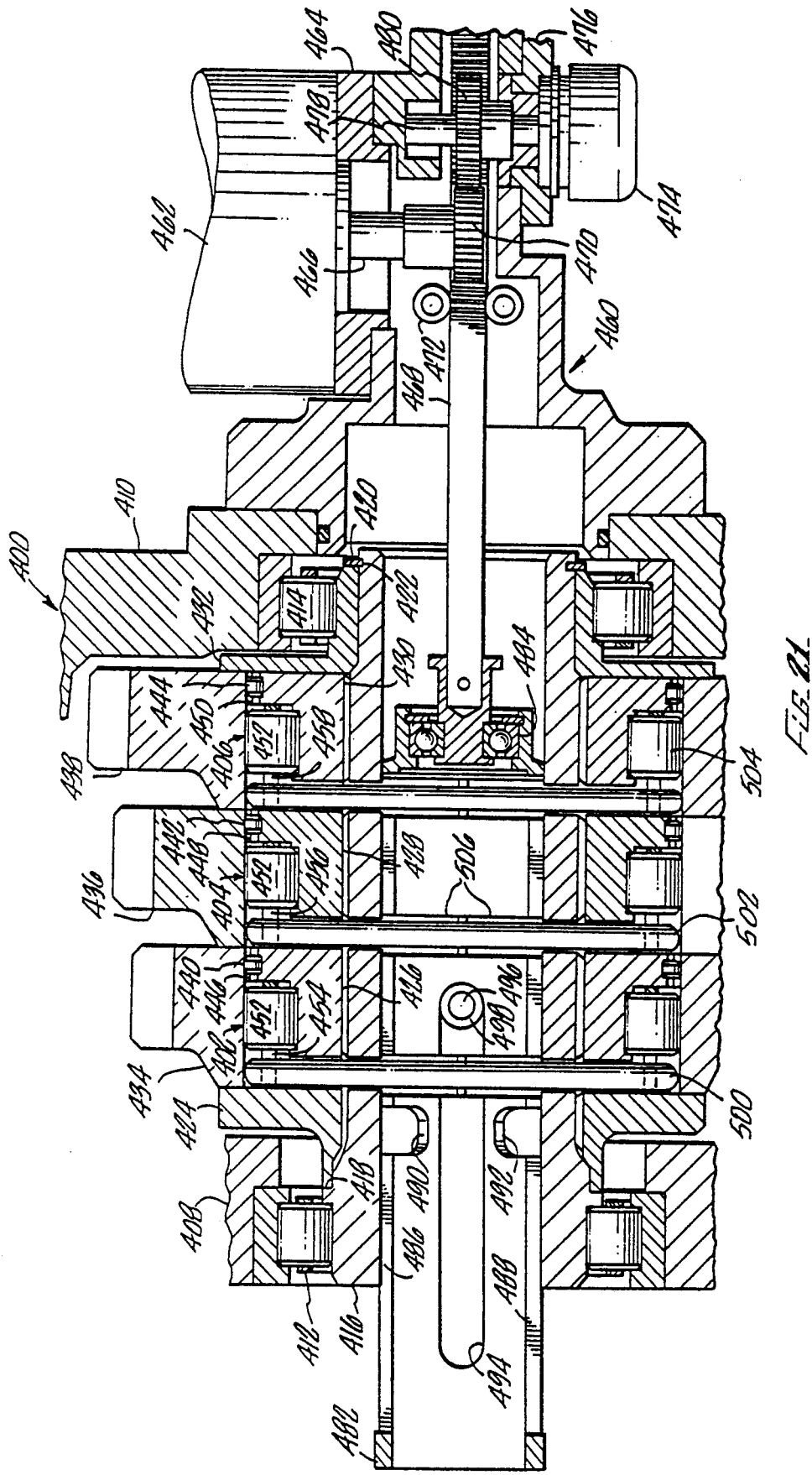
FIG. 21 is a cross-sectional view of a three speed transmission.
Figure 22:
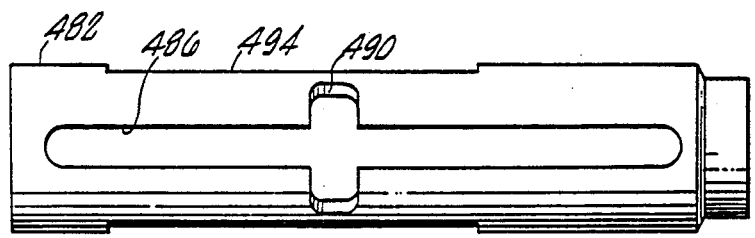
FIG. 22 is a plan view of an actuator for the transmission of FIG. 21.

Looking to FIG. 21, a three speed transmission, generally designated 400 is illustrated to include three engagement mechanisms 402, 404, 406. The transmission 400 is contemplated to include constant mesh gears associated with an output shaft (not shown). A first transmission case component 408 and a second transmission case component 410 mount through roller bearings 412, 414 a splined hollow shaft 416. It is to this shaft that the engagement mechanisms 402, 404, 406 are mounted.

The mounting length of the hollow shaft 416 is defined by a shoulder 418 adjacent to the roller bearing 412. At the other end, a spring clip 420 seats within a groove 422. Mounted to the splined hollow shaft 416 between the shoulder 418 and the spring clip 420 are an end flange 424, first, second and third engagement inners 426, 428, 430, and a second end flange 432. The engagement inners 426, 428, 430 are configured as in the foregoing embodiments.

The end flanges 424, 432 extend outwardly of the engagement inners 426, 428, 430 to locate first, second and third engagement outers 434, 436, 438. The engagement inners 426, 428, 430 extend outwardly to locate roller bearings 440, 442, 444 having cages 446, 448, 450, respectively. These bearings 440, 442, 444 rotatably support the engagement outers 434, 436, 438. The engagement outers including gear teeth to operate as gear wheels in constant mesh with gear wheels mounted to an output shaft (not shown). As in prior embodiments, wedging elements 452 are positioned between the cam surfaces of the inner races of the engagement inners 426, 428, 430 and the outer races of the engagement outers 434, 436, 438. Wedging element cages 454, 456, 458 control the location of the wedging elements 452 in each of the engagement mechanisms 402, 404, 406, respectively.

A control assembly, generally designated 460, is mounted to the component 410. This assembly 460 mounts a driver to control the engagement of the mechanisms 402, 404, 406. The driver includes a motor 462 mounted to the control assembly 460 by means of a motor mount 464. The motor includes a drive shaft 466 and is controlled so as to operate as a servo motor. The drive shaft 466 is coupled with a rack 468 by means of a pinion 470. The rack 468 is able to move longitudinally through the hollow shaft 416 and is controlled by guide rollers 472, some of which are illustrated. Also mounted in the control assembly 460 is a potentiometer 474 and potentiometer mount 476. The potentiometer 474 includes an input shaft 478 and a pinion 480 also mounted to the rack 468.

Longitudinally slidable in the hollow shaft 416 and coupled to the rack 468 is an actuator 482. The actuator 482 is a hollow cylinder closely fitting within the interior of the hollow shaft 416. The rack 468 is coupled with the actuator 482 through a thrust bearing 484. The thrust bearing 484 accommodates rotation of the actuator 482 while the rack does not rotate. Through appropriate control mechanisms, the driver operates to locate the actuator 482 at various preselected positions longitudinally within the hollow shaft 416. The actuator 482 includes first and second longitudinal slots 486, 488. These slots are substantially identical and diametrically displaced in the actuator 482. The slots 486, 488 each include a lateral notch 490, 492. These lateral notches 490, 492 preferably extend to either side of the slots 486, 488, respectively, in order to accommodate by directional engagement of the engagement mechanisms 402, 404, 406. Diametrically opposed neutral slots 494 also extend longitudinally along the actuator 482. The neutral slots may be angularly displaced from the longitudinal slots 486, 488 or may be extensions thereof. Positioned in the neutral slots 494 is a neutral pin 496. The neutral pin includes rotatably mounted bearings 498 about the neutral pin 496. These bearings are collars which are positioned such that they extend through the neutral slots 494. The collars 498 are sized such that they closely fit within the slot 494 to maintain the actuator 482 angularly aligned within the hollow shaft 416.

Located within the longitudinal slots 486, 488 are members which function as cage control pins 500, 502, 504. Each cage control pin 500, 502, 504 includes bearings 506 which extend through the slots 486, 488. The pins 500, 502, 504 extend radially outwardly through the hollow shaft 416 to engage with the cages 454, 456, 458 controlling the wedging elements 452. The construction of the pins 500, 502, 504 with the bearings 506 closely fits within the longitudinal slots 486, 488 such that the cages 454, 456, 458 of the wedging elements 452 are closely controlled to the neutral position except when the pins 500, 502, 504 engage the lateral notches 490, 492. Angularly extending holes 508 receive the pins 500, 502, 504 and allow them to move angularly when engaging the lateral notches 490, 492.

The neutral pin 496 extends outwardly to engage the hollow shaft 416 at either end of the pin. Thus, the hollow shaft 416 retains the neutral pin 496 and in turn the actuator 482 in alignment angularly fixed relative to the hollow shaft 416.

Figure 23:
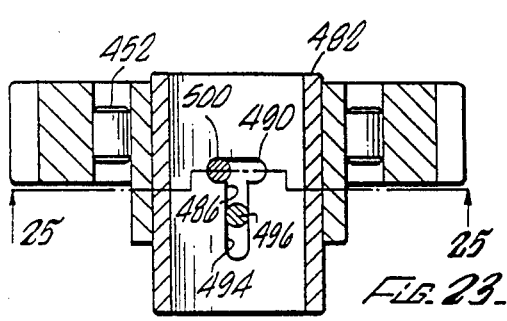
FIG. 23 is a simplified cross-sectional view of an actuator and with a cage control pin in the engaged position.
Figure 24:
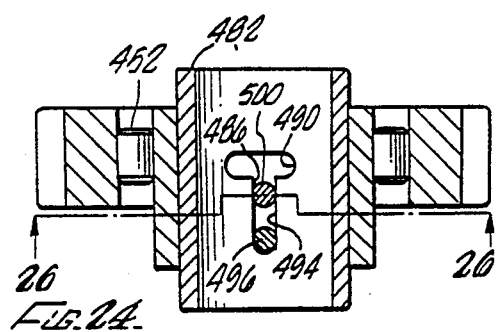
FIG. 24 is a simplified cross-sectional view of the actuator of FIG. 23 with the cage control pin in the disengaged position.
Figure 25:
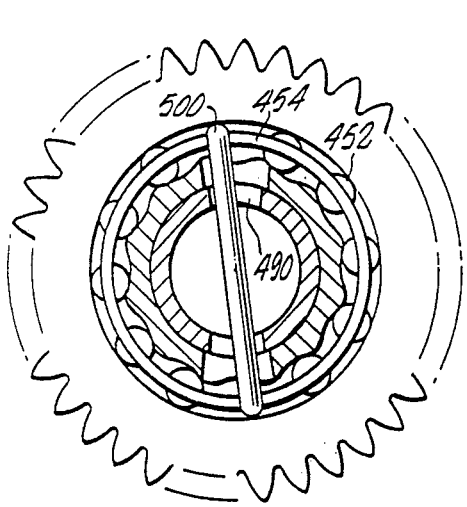
FIG. 25 is a simplified cross-sectional view taken along line 25—25 of FIG. 23.
Figure 26:
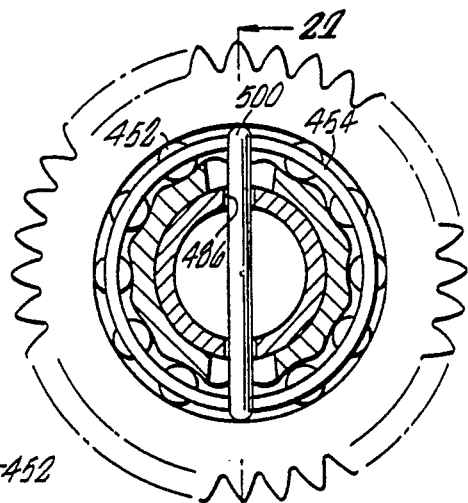
FIG. 26 is a simplified cross-sectional view taken along line 26—26 of FIG. 24.
Figure 27:
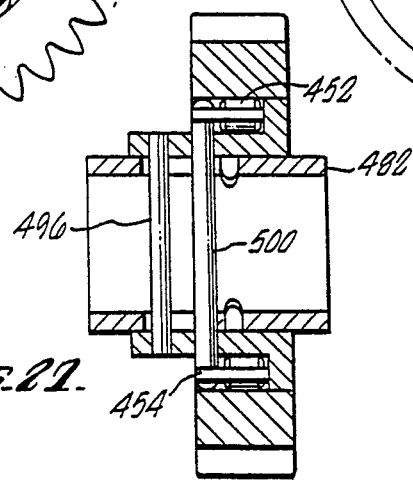
FIG. 27 is a cross-sectional view taken along line 27—27 of FIG. 26.

Simplified illustrations of the operation of the actuator are illustrated in FIGS. 23 through 27. In this instance, the neutral slots 494 are simply extensions of the longitudinal slots 486, 488. FIGS. 23 and 25 illustrate an engagement of an engagement mechanism with the pin 500 extending in the lateral notches 490, 492. In FIG. 24 and 26, the pin 500 has been relocated in the longitudinal slot 486 which retains it and the associated cage and wedging elements in the neutral position. The movement of the actuator 482 is accomplished through the use of the servo motor 462 when the power is momentarily interrupted so as to bring the pin 500 into alignment with the longitudinal slots 486, 488.

Figure 28:
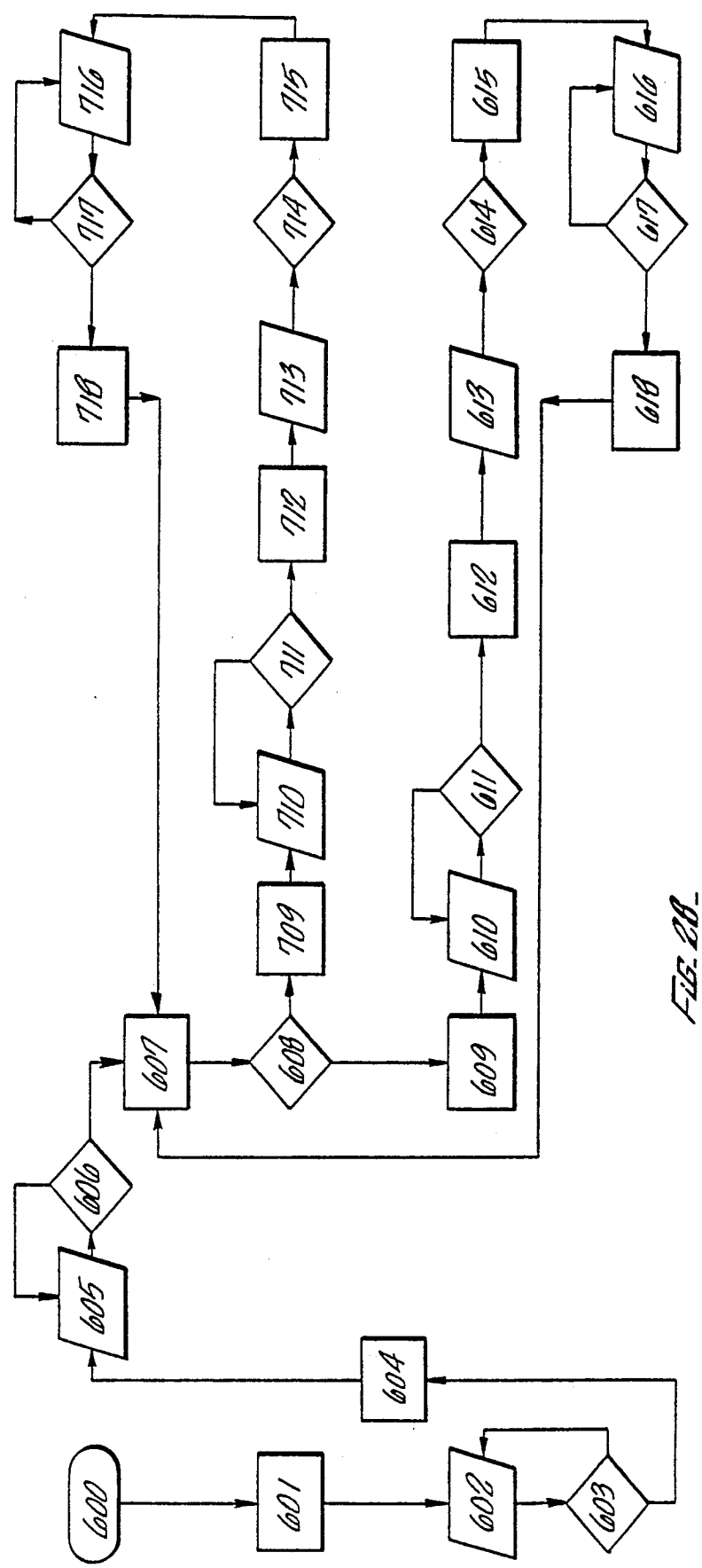
FIG. 28 is a logic diagram of a shift system for a power train.

A central processing unit is contemplated for provision with the driver for controlling the transmission in a vehicle drive train. FIG. 28 is a logic diagram of such a shift system. The system contemplates a manual clutch which may be mechanical, hydraulic or electric. The system does not interact, in this embodiment, with the engine. The engine is independently controlled through a throttle mechanism. Finally, shift control is achieved through a manual selection control switch mounted in the vehicle.

Using such a control set up with the transmission of FIG. 21, the sequence of events in FIG. 28 includes a first step 600 to initialize the computer ON and power up. The transmission is put into neutral in step 601. Next, the system checks to see if the transmission is in neutral from the potentiometer 474 at step 602. At step 603, a decision is made to return to step 602 if the transmission is not in neutral. If the transmission is in neutral, a neutral indicator light is turned on in step 604. A second check is made to see if reverse is engaged in step 605. A decision is made at step 606 to return to step 605 if reverse is engaged and proceed to step 607 if reverse is not engaged. At step 607 the system waits for a shift command.

Once a shift command is received from the mechanical selection control, the selection of routines is made at step 608. The mechanical shift control indicates neutral, and steps both up and down. A plurality of steps may be requested at once without engaging intermediate gears if the clutch remains disengaged. If the shift is up, the up-shift routine is called at 609. The position of the clutch is sensed at step 610. If the clutch is engaged, a decision that is made at step 611 to return to checking of the disengagement at step 610. If the clutch is disengaged, the up-shift routine proceeds at step 612. The up-shift routine also includes inhibiting the clutch from reengagement. Although the clutch is manually actuated, clutch reengagement is selectively inhibited by the program to avoid recoupling the transmission before shifting is complete. Once the up-shift routine has been completed, the potentiometer is checked to see if the actuator 482 is in appropriate in-gear position at step 613. If it is determined that the shift is not complete, when the shift is determined to be complete at step 614, the selected gear indicator is activated and the inhibit on the clutch is released to allow clutch reengagement at step 615. Next the clutch is sensed to see if it is engaged in step 616. If not, the clutch is again retested through step 617 until engaged. When the clutch is engaged, the system returns via step 618 to wait for shift command at step 607.

A substantially identical routine is undertaken for a down-shift. Rather than repeat the substantially identical steps, comparable steps to those described at 609 through 618 are labelled as 709 through 718, respectively.

For the operator to undertake a shift in a vehicle, the up-shift, down-shift or neutral selection is made. Before or after that selection, the clutch is disengaged through manual operation. As in normal standard shifting, the throttle is released. The shift automatically can occur in a small fraction of a second. Once the shift is complete, throttle can be reapplied and the clutch released to engagement. The shifting mechanism is typically far faster than human reaction. However, in the event that the shift is not complete, the clutch cannot be reengaged until that shift is complete except for override provision through a further shift. Such a system can give extreme shifting speed with appropriate manual controls to the operator for uses particularly adapted to racing.

Thus, an engagement mechanism is disclosed which has the capability of being operated either manually or automatically to provide a lightweight, fast actuating and strong transmission, providing clutchless, low impact shifts or clutched power shifts and finding utility in a variety of uses including automotive transmissions, machine tools and the like. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:
1. A drive train comprising
   an engine;
   a transmission, said transmission including constant mesh gearing and a two-way roller clutch to control engagement of said gearing;

a clutch in the drive train coupled between said engine and said transmission;
a sensor for sensing an engine condition indicative of generated power;
a variable rate clutch actuator coupled to said clutch;
a shift actuator coupled to said roller clutch;
a central processing unit coupled with said sensor, said variable rate clutch actuator and said shift actuator to inhibit engagement, by said variable rate clutch actuator, of said clutch when said shift actuator is not in a position of full engagement of said roller clutch.

2. A drive train comprising
an engine;
a transmission, said transmission including constant mesh gearing, two-way roller clutches to control engagement of said gearing and an actuator controlling engagement of said roller clutches;
a clutch in the drive train coupled between said engine and said transmission;
a shift control including a drive for driving said actuator to specific roller clutch engagement positions;
an electrically actuated clutch inhibit coupled to said clutch to selectively maintain said clutch disengaged;
a central processing unit coupled with said shift control, said actuator and said electrically actuated clutch inhibit, said central processing unit activating said clutch inhibit when said actuator is displaced from a selected one of said specific roller clutch engagement positions selected by said shift control.

3. The drive train of claim 2 wherein said shift control includes a manual selection control coupled with said motor through said central processing unit.

4. The drive train of claim 3 wherein said central processing unit is further coupled with said clutch and programmed to inhibit said shift control until disengagement of said clutch.

5. The drive train of claim 2 further comprising an engine having a throttle manually actuated independently of said shift control.

6. A drive train comprising
an engine;
a clutch coupled to said engine;
a transmission coupled to said clutch, said transmission including constant mesh gearing, two-way roller clutches to control engagement of said gearing and an actuator controlling engagement of said roller clutches;
a shift control including a drive coupled with said actuator for driving said actuator to specific roller clutch engagement positions;
an electrically actuated clutch inhibit coupled to said clutch to selectively maintain said clutch disengaged;
a central processing unit coupled with said shift control, said actuator and said electrically actuated clutch inhibit, said central processing unit activating said clutch inhibit when said actuator is displaced from a selected one of said specific roller clutch engagement positions selected by said shift control, said shift control including a selection control coupled with said drive through said central processing unit, said central processing unit being further coupled with said clutch and programmed to inhibit said shift control until disengagement of said clutch, said engine having a throttle actuated independently of said shift control.

7. A drive train comprising
an engine;
a transmission, said transmission including constant mesh gearing and a two-way roller clutch to control engagement of said gearing;
a clutch in the drive train coupled between said engine and said transmission;
a sensor for sensing an engine condition indicative of generated power;
a variable rate clutch actuator coupled to said clutch;
a shift actuator coupled to said roller clutch;
a central processing unit coupled with said sensor, said variable rate clutch actuator and said shift actuator to inhibit engagement, by said variable rate clutch actuator, of said clutch when said shift actuator is not in a position of full engagement of said roller clutch, said central processing unit including sensors to determine transmission shaft speeds to inhibit said shift actuator unless said two-way roller clutch is at near synchronous speeds.

8. A drive train comprising
an engine;
a transmission, said transmission including constant mesh gearing, two-way roller clutches to control engagement of said gearing and an actuator controlling engagement of said roller clutches;
a clutch in the drive train coupled between said engine and said transmission;
a shift control including a drive for driving said actuator to specific roller clutch engagement positions;
an electrically actuated clutch inhibit coupled to said clutch to selectively maintain said clutch disengaged;
a central processing unit coupled with said shift control, said actuator and said electrically actuated clutch inhibit, said central processing unit activating said clutch inhibit when said actuator is displaced from a selected one of said specific roller clutch engagement positions selected by said shift control, said central processing unit including sensors to determine transmission shaft speeds to inhibit said shift actuator unless said two-way roller clutch is at near synchronous speeds.

9. A drive train comprising
an engine;
a clutch coupled to said engine;
a transmission coupled to said clutch, said transmission including constant mesh gearing, two-way roller clutches to control engagement of said gearing and an actuator controlling engagement of said roller clutches;
a shift control including a drive coupled with said actuator for driving said actuator to specific roller clutch engagement positions;
an electrically actuated clutch inhibit coupled to said clutch to selectively maintain said clutch disengaged;
a central processing unit coupled with said shift control, said actuator and said electrically actuated clutch inhibit, said central processing unit activating said clutch inhibit when said actuator is displaced from a selected one of said specific roller clutch engagement positions selected by said shift control, said shift control including a selection control coupled with said drive through said central processing unit, said central processing unit being further coupled with said clutch and programmed to inhibit said shift control until disengagement of said clutch, said engine having a throttle actuated independently of said shift control, said central processing unit including sensors to determine transmission shaft speeds to inhibit said actuator unless said two-way roller clutch is at near synchronous speeds.

* * * * *